US009108250B1

(12) United States Patent  (10) Patent No.: US 9,108,250 B1
Bui  (45) Date of Patent: Aug. 18, 2015

(54) ADJUSTABLE BUSHING ASSEMBLIES

(71) Applicant: The Boeing Company, Chicago, IL (US)

(72) Inventor: Peter H. Bui, Lynnwood, WA (US)

(73) Assignee: THE BOEING COMPANY, Chicago, IL (US)

( * ) Notice: Subject to any disclaimer, the term of this patent is extended or adjusted under 35 U.S.C. 154(b) by 247 days.

(21) Appl. No.: 13/665,874

(22) Filed: Oct. 31, 2012

(51) Int. Cl.
*B23B 47/28* (2006.01)

(52) U.S. Cl.
CPC .............. *B23B 47/28* (2013.01); *B23B 2247/00* (2013.01); *Y10T 408/567* (2015.01); *Y10T 408/568* (2015.01); *Y10T 408/569* (2015.01)

(58) Field of Classification Search
CPC .... B23B 47/28; B23B 47/287; B23B 2247/00
USPC ............. 408/72 B, 115 B, 115 R, 241 B, 236
See application file for complete search history.

(56) References Cited

U.S. PATENT DOCUMENTS

| | | | | | |
|---|---|---|---|---|---|
| 1,770,721 | A | * | 7/1930 | Willis | 408/72 R |
| 1,923,847 | A | * | 8/1933 | Seelert | 408/83.5 |
| 1,954,241 | A | * | 4/1934 | Hellyer | 408/83.5 |
| 2,431,476 | A | | 11/1947 | Hall | |
| 2,497,679 | A | | 2/1950 | Maples | |
| 2,823,591 | A | * | 2/1958 | Craddock et al. | 409/190 |
| 3,157,068 | A | * | 11/1964 | Rickert | 408/75 |
| 3,158,045 | A | * | 11/1964 | Siler | 408/1 R |
| 3,282,132 | A | * | 11/1966 | Neuschotz | 408/115 B |
| 3,764,204 | A | * | 10/1973 | Kammeraad | 408/75 |
| 3,977,805 | A | * | 8/1976 | Wanous | 408/115 B |
| 4,332,066 | A | * | 6/1982 | Hailey et al. | 29/26 R |
| 4,365,917 | A | * | 12/1982 | Harmand | 409/201 |
| 4,999,896 | A | * | 3/1991 | Mangus et al. | 29/34 B |
| 5,001,871 | A | * | 3/1991 | Harmand | 451/431 |
| 5,017,062 | A | * | 5/1991 | Leroux et al. | 409/179 |
| 5,018,912 | A | * | 5/1991 | Reitz | 408/115 R |
| 5,092,552 | A | * | 3/1992 | Dayton et al. | 248/280.11 |
| 5,226,763 | A | * | 7/1993 | Lind | 408/236 |
| 5,302,057 | A | * | 4/1994 | Siegfried | 408/1 R |
| 5,702,212 | A | * | 12/1997 | Erath et al. | 408/153 |
| 5,848,859 | A | * | 12/1998 | Clark et al. | 408/1 R |
| 6,083,154 | A | * | 7/2000 | Liu et al. | 600/234 |
| 6,231,506 | B1 | * | 5/2001 | Hu et al. | 600/210 |
| 6,331,158 | B1 | * | 12/2001 | Hu et al. | 600/232 |
| 6,902,343 | B2 | * | 6/2005 | Hermens et al. | 403/131 |
| 7,207,751 | B2 | * | 4/2007 | Feddersen | 408/115 R |
| 7,220,085 | B2 | * | 5/2007 | Nader et al. | 408/1 R |
| 7,611,314 | B2 | | 11/2009 | Lipczynski et al. | |
| 7,753,612 | B2 | * | 7/2010 | Bouru et al. | 403/158 |
| 7,771,144 | B1 | * | 8/2010 | Nader et al. | 408/1 R |
| 7,901,165 | B2 | | 3/2011 | Lipczynski et al. | |

* cited by examiner

*Primary Examiner* — Eric A Gates

(74) *Attorney, Agent, or Firm* — Yee & Associates, P.C.

(57) ABSTRACT

An apparatus, system, and method for creating final openings in a part having initial openings using an alignment system. In one illustrative embodiment, the alignment system comprises a structure having a plurality of openings and a plurality of bushing assemblies. Each of the plurality of bushing assemblies is associated with one of the plurality of openings. Each of the plurality of bushing assemblies comprises a first element, a second element, and a core element located between the first element and the second element. The core element has at least two rotational degrees of freedom and at least two translational degrees of freedom when a bushing assembly is in a free state and zero degrees of freedom when the bushing assembly is in a fixed state.

21 Claims, 24 Drawing Sheets

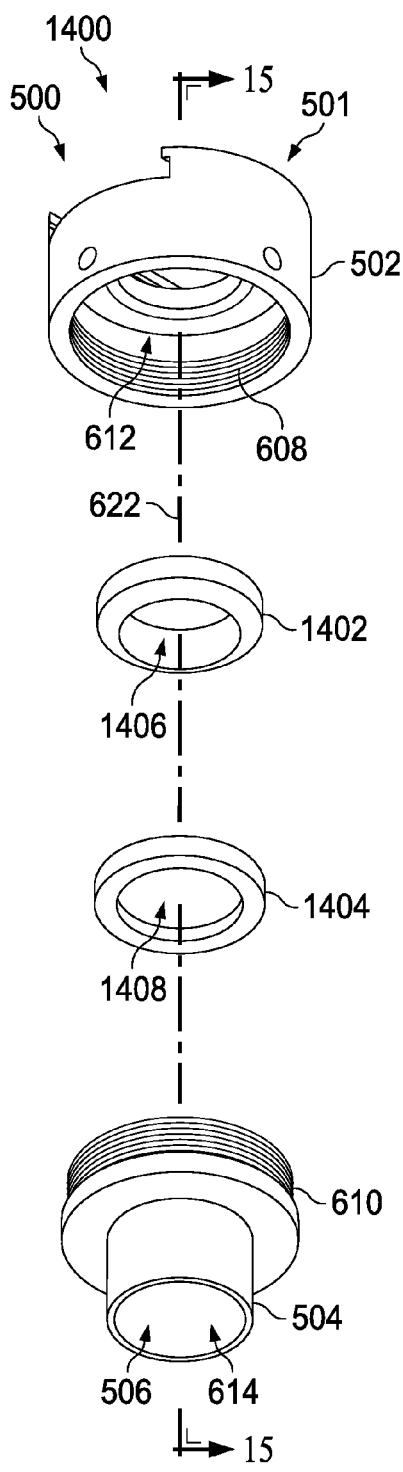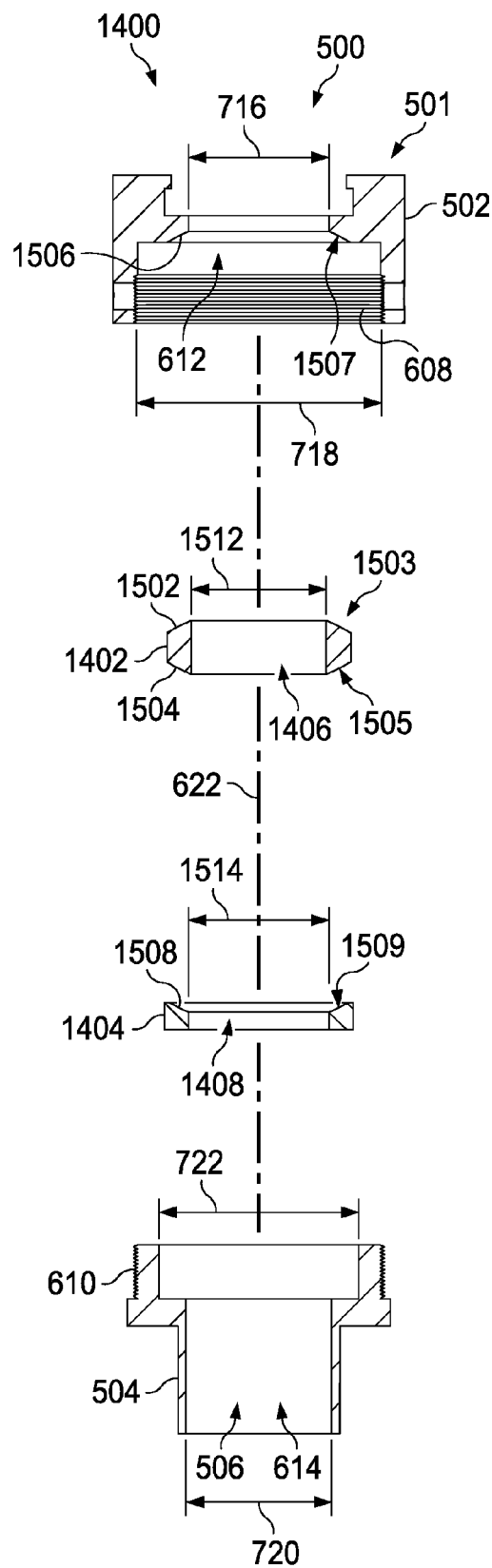
FIG. 14
FIG. 15

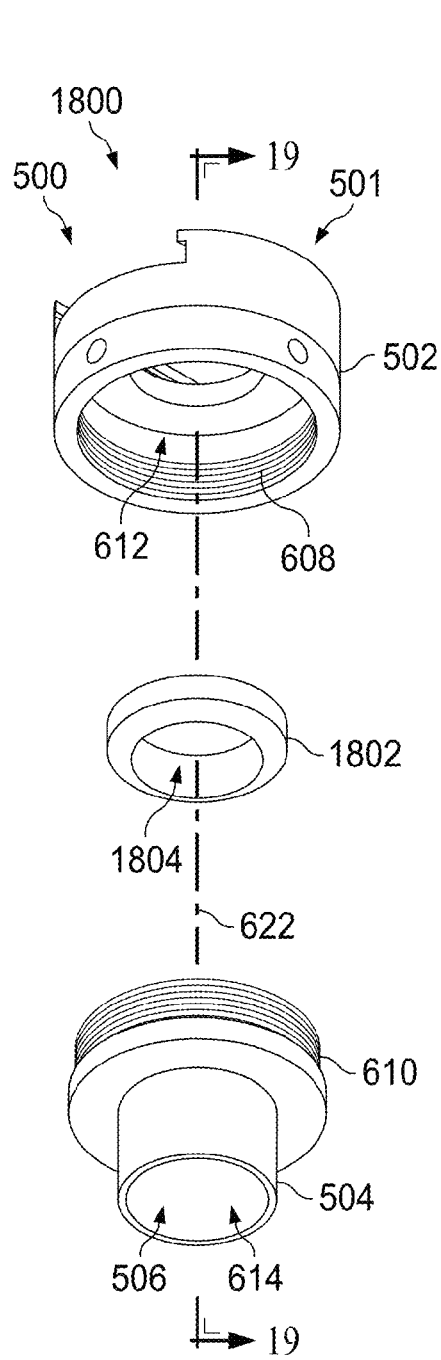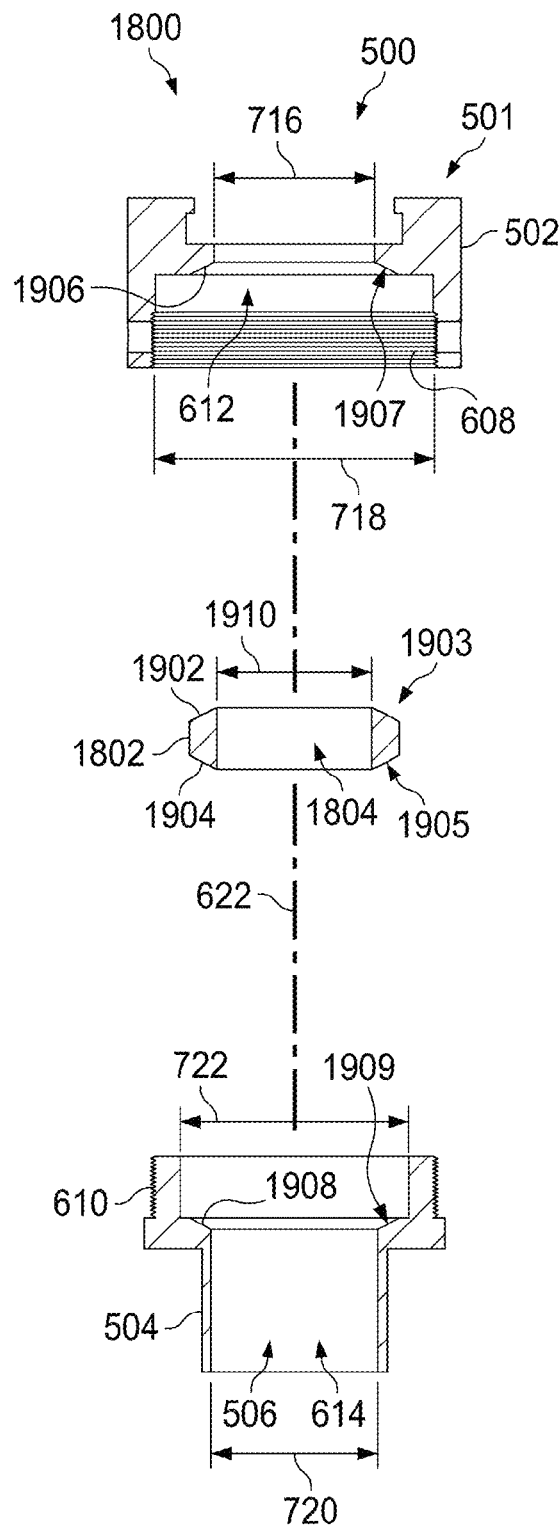
FIG. 18
FIG. 19

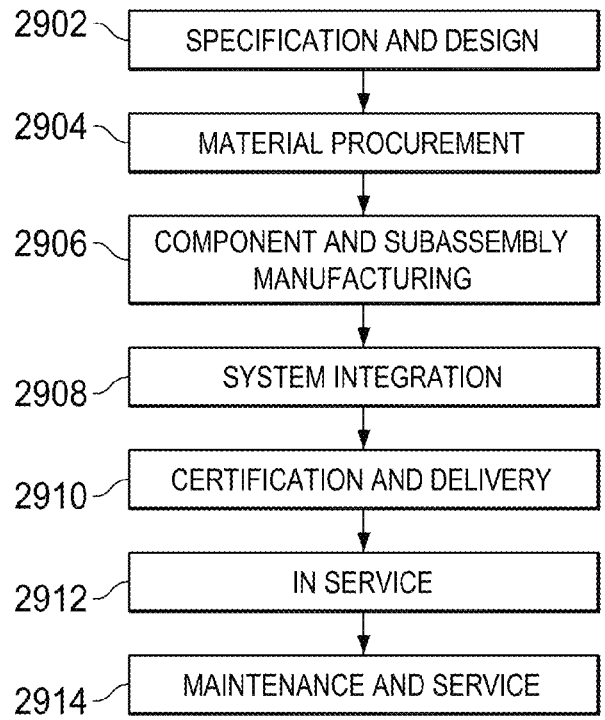
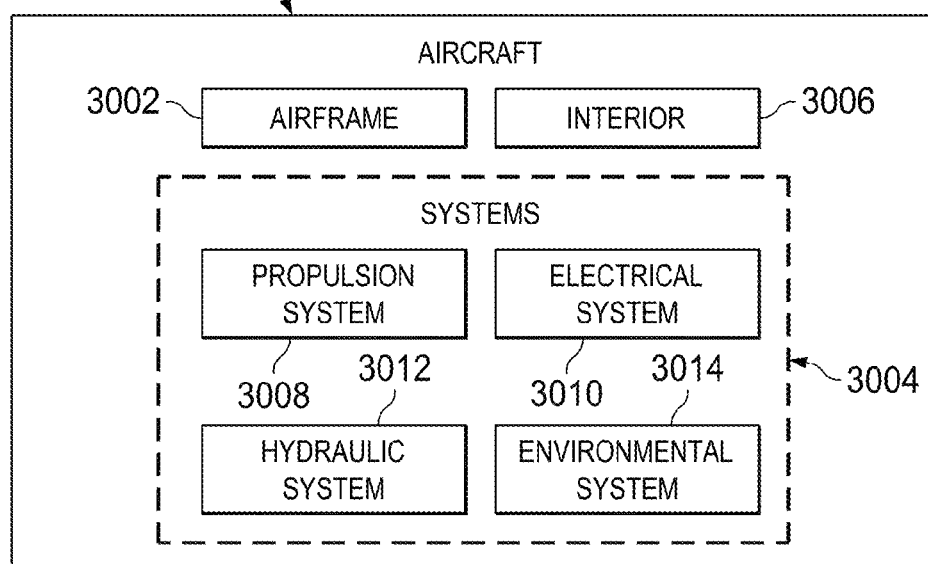

ADJUSTABLE BUSHING ASSEMBLIES

BACKGROUND INFORMATION

1. Field

The present disclosure relates generally to forming openings in parts. In particular, the present disclosure relates to an apparatus and method for forming one or more final openings in a part or a stackup of parts, wherein the one or more final openings are substantially concentric with one or more initial openings in the part or the stackup of parts.

2. Background

Assembling parts together routinely includes drilling holes through these parts and installing fastener systems within these holes. For example, at least a portion of a first part may overlap a second part. Multiple holes may need to be drilled through the overlapping portions of these parts for installing fastener systems to attach the first part to the second part.

In some cases, pilot holes may be formed in the first part. Once the first part is stacked together with the second part, these pilot holes may identify target locations for forming larger holes that will extend through both the first part and second part to receive the fastener systems.

The larger holes that extend through both the first part and the second part may be formed using a tool, such as a drill. A jig plate may be used to locate the drill relative to the first part during the drilling operation, whereby the larger holes are formed in the target locations defined by the pilot holes.

However, in some cases, one or more pilot openings in the first part may have an offset relative to an axis perpendicular to the surface of the part. Consequently, the larger openings drilled through the part without accounting for such offset may have a shape and/or size outside of selected tolerances.

SUMMARY

Accordingly, it would be desirable to provide a method and apparatus that address at least some of the issues discussed above and deliver other advantages.

In one illustrative embodiment, a bushing assembly comprises a first element, a second element, and a core element located between the first element and the second element. The core element has at least two rotational degrees of freedom when the bushing assembly is in a free state and zero degrees of freedom when the bushing assembly is in a fixed state.

In another illustrative embodiment, an alignment system comprises a structure having a plurality of openings and a plurality of bushing assemblies. Each of the plurality of bushing assemblies is associated with one of the plurality of openings. Each of the plurality of bushing assemblies comprises a first element, a second element, and a core element located between the first element and the second element. The core element has at least two rotational degrees of freedom and at least two translational degrees of freedom when the bushing assembly is in a free state and zero degrees of freedom when the bushing assembly is in a fixed state.

In yet another illustrative embodiment, a method for creating final openings in a part having initial openings is provided. The method uses a structure including openings each associated with one of a plurality of bushing assemblies. The initial openings in the part have a first pattern and the openings of the structure have a second pattern deviating from the first pattern within selected tolerances. Each of the plurality of bushing assemblies is configurable in a free state or in a fixed state. In the free state, an element of each of the plurality of bushing assemblies has at least two rotational degrees of freedom and at least two translational degrees of freedom. In the fixed state, the element of each of the plurality of bushing assemblies has zero degrees of freedom. The method begins by configuring each of the plurality of bushing assemblies in a free state. The structure is positioned proximate to the part so that the first pattern deviates from the second pattern within the selected tolerances. At least one of the openings of the structure is offset, not concentric, or both with respect to an initial opening corresponding thereto. An element of each of the plurality of bushing assemblies is concentrically aligned with the initial openings corresponding to the openings of the structure. Each of the plurality of bushing assemblies is configured in a fixed state. A tool is concentrically aligned with each of the initial openings for processing the initial openings to form final openings using the element of each of the plurality of bushing assemblies.

The features and functions of one or more aspects of the disclosed method and apparatus can be achieved independently in various examples of the present disclosure or may be combined in yet other examples, as will become apparent after consideration of the ensuing description, the accompanying drawings, and the appended claims. The drawings are provided for illustrative purposes only and are not intended to limit the scope of the present disclosure.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

FIG. 14 is an illustration of an exploded isometric view of yet another configuration for the bushing assembly in accordance with an illustrative example;

FIG. 15 is an illustration of a cross-sectional view of a configuration for the bushing assembly in accordance with an illustrative example;

FIG. 18 is an illustration of an exploded isometric view of still yet another configuration for the bushing assembly in accordance with an illustrative example;

FIG. 19 is an illustration of a cross-sectional view of a configuration for the bushing assembly in accordance with an illustrative example;

FIG. 29 is an illustration of an aircraft manufacturing and service method in accordance with an illustrative example; and FIG. 30 is an illustration of an aircraft in accordance with an illustrative example.

DETAILED DESCRIPTION

Figure 1:
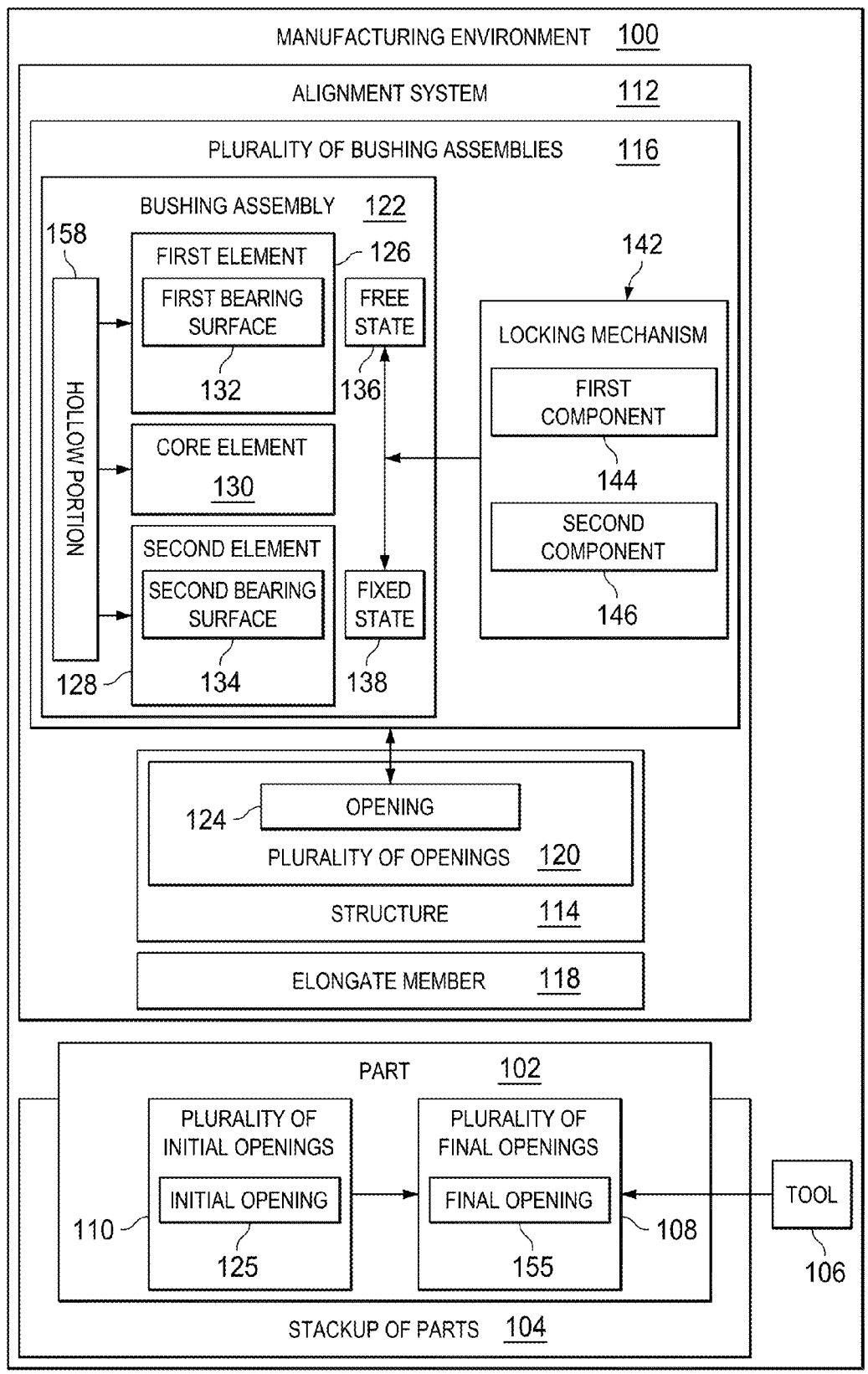
FIG. 1 is an illustration of a manufacturing environment in the form of a block diagram in accordance with an illustrative example.

Referring now to the figures and, in particular, with reference to FIG. 1, an illustration of a manufacturing environment in the form of a block diagram is depicted in accordance with an illustrative example. In FIG. 1, manufacturing environment 100 is an example of an environment in which part 102 may be processed.

Processing part 102 may include, for example, without limitation, forming openings in part 102, increasing the sizes of existing openings in part 102, positioning part 102 relative to one or more other parts, fastening part 102 to one or more other parts, installing part 102 within an assembly of parts, performing other types of manufacturing operations involving part 102, or some combination of the above. As used herein, positioning parts relative to each other may include overlapping at least some portions of these parts.

In one illustrative example, part 102 is positioned relative to one or more other parts to form stackup of parts 104. In particular, stackup of parts 104 may include two or more parts that have been positioned one on top of the other such that at least a portion of each of these parts overlaps with one or more portions of other parts in stackup of parts 104.

Within manufacturing environment 100, tool 106 may be used to form plurality of final openings 108 in part 102. Tool 106 may take the form of, for example, without limitation, a drill. When part 102 belongs to stackup of parts 104, tool 106 may be used to form plurality of final openings 108 that extend through part 102 and through at least a portion of the other parts in stackup of parts 104.

In one illustrative example, plurality of final openings 108 extends all the way through stackup of parts 104 such that each final opening in plurality of final openings 108 is a through opening. In this manner, plurality of final openings 108 may be configured to receive a corresponding plurality of fastener systems for use in fastening the parts in stackup of parts 104 together.

In some illustrative examples, part 102 has plurality of initial openings 110. In some cases, plurality of initial openings 110 may be openings formed directly in part 102. In other cases, an initial opening in plurality of initial openings 110 may be an opening in part 102 that has been lined with a hollow cylindrical structure such as, for example, a sleeve, a bushing, or some other type of hollow cylindrical structure. In these cases, the size of the initial opening may be considered the size of the hollow portion of the hollow cylindrical structure. In other words, the diameter of the initial opening may be the diameter of the hollow portion of the hollow cylindrical structure.

In these examples, plurality of initial openings 110 may be formed based on a pattern. For example, the distance between each pair of neighboring initial openings in plurality of initial openings 110 may be chosen based on particular specifications, standards, or requirements.

Plurality of initial openings 110 may be used to identify target locations and desired orientations for plurality of final openings 108 to be formed. At least one final opening will be larger in diameter than the at least one initial opening corresponding thereto.

Alignment system 112 may be used to control the orientation and/or location of tool 106 relative to part 102 and/or stackup of parts 104 during the formation of plurality of final openings 108. In particular, alignment system 112 may be used to ensure that each of plurality of final openings 108 is substantially concentric with the corresponding initial opening.

In an illustrative example, alignment system 112 includes structure 114, plurality of bushing assemblies 116, and elongate member 118. Structure 114 may be comprised of any number of structural components. Structure 114 has plurality of openings 120. Plurality of openings 120 are formed in structure 114 based on the same pattern used to form plurality of initial openings 110.

In this manner, plurality of openings 120 in structure 114 may generally correspond with plurality of initial openings 110. When formed, plurality of initial openings 110 may have a first pattern. Plurality of openings 120 may have a second pattern. The second pattern may deviate from the first pattern within selected tolerances.

In some cases, plurality of openings 120 may be located in a plate that is part of structure 114. This plate may be referred to as a jig plate.

Structure 114 is configured for placement over part 102. In particular, structure 114 may be positioned proximate to part 102 so that the second pattern of plurality of openings 120 in structure 114 deviates within selected tolerances from the first pattern of plurality of initial openings 110 in part 102, corresponding thereto. Not all of plurality of openings 120 in structure 114 can be aligned, concentric, or both with plurality of initial openings 110 corresponding thereto.

For example, structure 114 may be positioned proximate to part 102 such that opening 124 in structure 114 is aligned with initial opening 125 in part 102. Opening 124 may be larger in diameter than initial opening 125. In these illustrative examples, opening 124 may not be aligned, concentric, or both with initial opening 125. In other words, opening 124 and initial opening 125 may not share the same center axis. Consequently, when tool 106 is aligned with opening 124 in structure 114, tool 106 may not concentrically align with initial opening 125.

Plurality of bushing assemblies 116 may be used to provide alignment of tool 106 with each of plurality of initial openings 110. Bushing assembly 122 may be an example of one implementation of a bushing assembly in plurality of bushing assemblies 116. Bushing assembly 122 may be associated with opening 124 in structure 114. In this manner, bushing assembly 122 may be positioned in general alignment with initial opening 125.

As used herein, when one component is "associated" with another component, this association is a physical association in the depicted examples. For example, a first component, such as bushing assembly 122, may be considered to be associated with a second component, such as opening 124 in structure 114, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In these illustrative examples, bushing assembly 122 includes first element 126, second element 128, and core element 130. In one illustrative example, each of first element 126, second element 128, and core element 130 take the form of a bushing. A bushing may also be referred to as a sleeve in some illustrative examples. Core element 130 is configured to be located between first element 126 and second element 128.

As depicted, first element 126 has first bearing surface 132, and second element 128 has second bearing surface 134. Core element 130 may be configured to be located between first bearing surface 132 and second bearing surface 134.

First bearing surface 132 and second bearing surface 134 may have various shapes. For example, first bearing surface 132 may have a first shape and second bearing surface 134 may have a second shape. The first shape and the second shape may be the same or different. The first shape and the second shape may be selected from a group consisting of a spherical convex shape, a spherical concave shape, a flanged shape, and some other type of shape.

In these illustrative examples, bushing assembly 122 may be configurable in free state 136 or fixed state 138. When bushing assembly 122 is configured in fixed state 138, core element 130 has zero degrees of freedom. Further, first element 126 and second element 128 also have zero degrees of freedom in fixed state 138. In other words, when bushing assembly 122 is in fixed state 138, first element 126, second element 128, and core element 130 are unable to move.

In fixed state 138, core element 130 is in contact with first bearing surface 132 of first element 126 and with second bearing surface 134 of second element 128. The type of contact between core element 130 and first element 126 and between core element 130 and second element 128 may depend not only on the first shape of first bearing surface 132 of first element 126 and the second shape of second bearing surface 134 of second element 128, but also on the shape of core element 130.

In one illustrative example, core element 130 has a first contact surface and a second contact surface. The first contact surface may have a first shape and the second contact surface may have a second shape. The first shape and the second shape may be the same or different. The first shape and the second shape may be selected from a group consisting of a spherical concave shape, a spherical convex shape, a flat shape, and some other type of shape. The flat shape may be selected from a group consisting of circular shapes and polygonal shapes.

In fixed state 138, the first contact surface of core element 130 may have surface contact, line contact, or point contact with first bearing surface 132 of first element 126. Similarly, in fixed state 138, the second contact surface of core element 130 may have surface contact, line contact, or point contact with second bearing surface 134 of second element 128.

As used herein, surface contact between two surfaces means that at least a portion of one surface, having a measurable surface area, contacts the other surface. Line contact between two surfaces, as used herein, means that at least a portion of at least one edge of one surface, has a measurable length, but no measurable surface area, contacts the other surface. Further, as used herein, point contact between two surfaces means that at least one point on one surface, having no measurable surface area or measurable length, contacts the other surface. Those skilled in the art will appreciate that the foregoing definitions are intended to illustrate the desired contact configurations with reference to abstract geometric shapes and are not intended to be strictly limiting when such configurations are embodied in physical objects.

In other illustrative examples, core element 130 may have a single contact surface configured to contact both first bearing surface 132 of first element 126 and second bearing surface 134 and second element 128 when bushing assembly 122 is in fixed state 138. This single contact surface may include a spherical portion. Depending on the first shape of first bearing surface 132 and the second shape of second bearing surface 134, the single contact surface of core element 130 may have surface contact, line contact, and/or point contact with these two bearing surfaces.

When bushing assembly 122 is configured in free state 136, core element 130 may have at least two rotational degrees of freedom with respect to a center axis through bushing assembly 122. This center axis may be referred to as a yaw axis. In one illustrative example, the at least two rotational degrees of freedom of core element 130 include pitch and roll. In particular, core element 130 may rotate about a pitch axis substantially perpendicular to the yaw axis and may rotate about a roll axis substantially perpendicular to both the pitch axis and the roll axis.

In some cases, core element 130 may also be allowed to yaw, or rotate about the yaw axis. In this manner, core element 130 may have three degrees of rotational freedom.

Further, in these illustrative examples, core element 130 may also have at least two translational degrees of freedom when bushing assembly 122 is configured in free state 136. In other words, core element 130 may move in a direction substantially parallel to the pitch axis and a direction substantially parallel to the roll axis. In this manner, core element 130 may be allowed to freely move in any direction substantially perpendicular to the yaw axis.

In some cases, core element 130 may also be allowed to freely move in a direction substantially parallel to the yaw axis through bushing assembly 122. In this manner, core element 130 may have three degrees of translational freedom. Depending on the implementation, core element 130 may have four, five, or six degrees of freedom.

Further, first element 126 and second element 128 may each have at least two degrees of translational freedom when bushing assembly 122 is configured in free state 136. In particular, first element 126 and second element 128 may each be capable of moving in directions substantially parallel to the pitch axis and the roll axis. In some cases, one or both of first element 126 and second element 128 may have three degrees of translational freedom. In other cases, one or both of first element 126 and second element 128 may have one rotational degree of freedom, yaw. In this manner, first element 126 and second element 128 may each have two, three, or four degrees of freedom.

In these illustrative examples, alignment system 112 includes a means for selectively achieving free state 136 and fixed state 138 for bushing assembly 122. In particular, bushing assembly 122 may include a means for configuring bushing assembly 122 alternately between free state 136 and fixed state 138. This means for alternating between free state 136 and fixed state 138 may take the form of locking mechanism 142.

As depicted, locking mechanism 142 may include first component 144 and second component 146. In one illustrative example, locking mechanism 142 comprises a clamping device comprised of first component 144 in the form of a first threaded component and second component 146 in the form of a second threaded component. The second threaded component may be threadingly engageable with the first threaded component.

In some cases, first element 126 of bushing assembly 122 may be implemented using first component 144 and second element 128 may be implemented using second component 146. In this manner, first bearing surface 132 may be a surface of first component 144 and second bearing surface 134 may be a surface of second component 146.

In some illustrative examples, first element 126 of bushing assembly 122 takes the form of a bushing, while second element 128 of bushing assembly 122 takes the form of a second component 146. In other illustrative examples, first element 126 takes the form of first component 144, while second element 128 takes the form of a bushing.

In these illustrative examples, bushing assembly 122 has hollow portion 158 that extends through first element 126, second element 128, and core element 130. In particular, hollow portion 158 may be formed by an opening in first element 126, an opening in second element 128, and an opening in core element 130. Depending on the implementation, hollow portion 158 may also extend through first component 144 and second component 146 of locking mechanism 142.

In an illustrative example, the openings in first element 126 and second element 128 may be larger than the opening in core element 130. Further, the diameter of the opening in core element 130 is the smallest diameter of hollow portion 158.

Hollow portion 158 is configured to receive tool 106 and guide tool 106 towards initial opening 125 in part 102. In particular, the opening in core element 130 is configured to form a sliding fit with tool 106. However, in some cases, the opening in core element 130 may not be concentric with initial opening 125. Consequently, tool 106 may not be aligned with initial opening 125 when tool 106 is guided by the opening in core element 130.

Elongate member 118 is used to align core element 130 with initial opening 125 such that the opening of core element 130 is substantially concentric with initial opening 125. Elongate member 118 may be a cylindrical member. For example, elongate member 118 may take the form of a pin.

In these illustrative examples, elongate member 118 may be inserted through hollow portion 158 of bushing assembly 122 into initial opening 125. Elongate member 118 has a length selected such that one end of elongate member 118 may be in initial opening 125 while the other end extends through and out of hollow portion 158 of bushing assembly 122.

The opening in core element 130 forms a sliding fit with elongate member 118. The fit formed between the opening in core element 130 and elongate member 118, as well as the at least two rotational degrees of freedom and the at least two translational degrees of freedom of core element 130, allow elongate member 118 to be aligned with initial opening 125 such that elongate member 118 is substantially concentric with initial opening 125. In other words, core element 130 may move at least one of rotationally and translationally such that elongate member 118 and the opening in core element 130 are substantially concentric with initial opening 125.

Locking mechanism 142 may be used to configure bushing assembly 122 into fixed state 138 such that core element 130 has zero degrees of freedom once core element 130 is aligned with initial opening 125. With bushing assembly 122 in fixed state 138, elongate member 118 may be removed from hollow portion 158 of bushing assembly 122.

Next, tool 106 may be inserted through hollow portion 158 of bushing assembly 122 in fixed state 138. The opening in core element 130, now substantially concentric with initial opening 125, guides tool 106 such that tool 106 is substantially concentric with initial opening 125. Tool 106 is used to process initial opening 125 to form final opening 155.

In this manner, plurality of bushing assemblies 116 may be used to concentrically align tool 106 with plurality of initial openings 110 in part 102. The use of alignment system 112 may increase the speed at which drilling operations are performed to form plurality of final openings 108. Further, using alignment system 112 may increase the accuracy with which plurality of final openings 108 are formed.

The illustration of manufacturing environment 100 and alignment system 112 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 2:
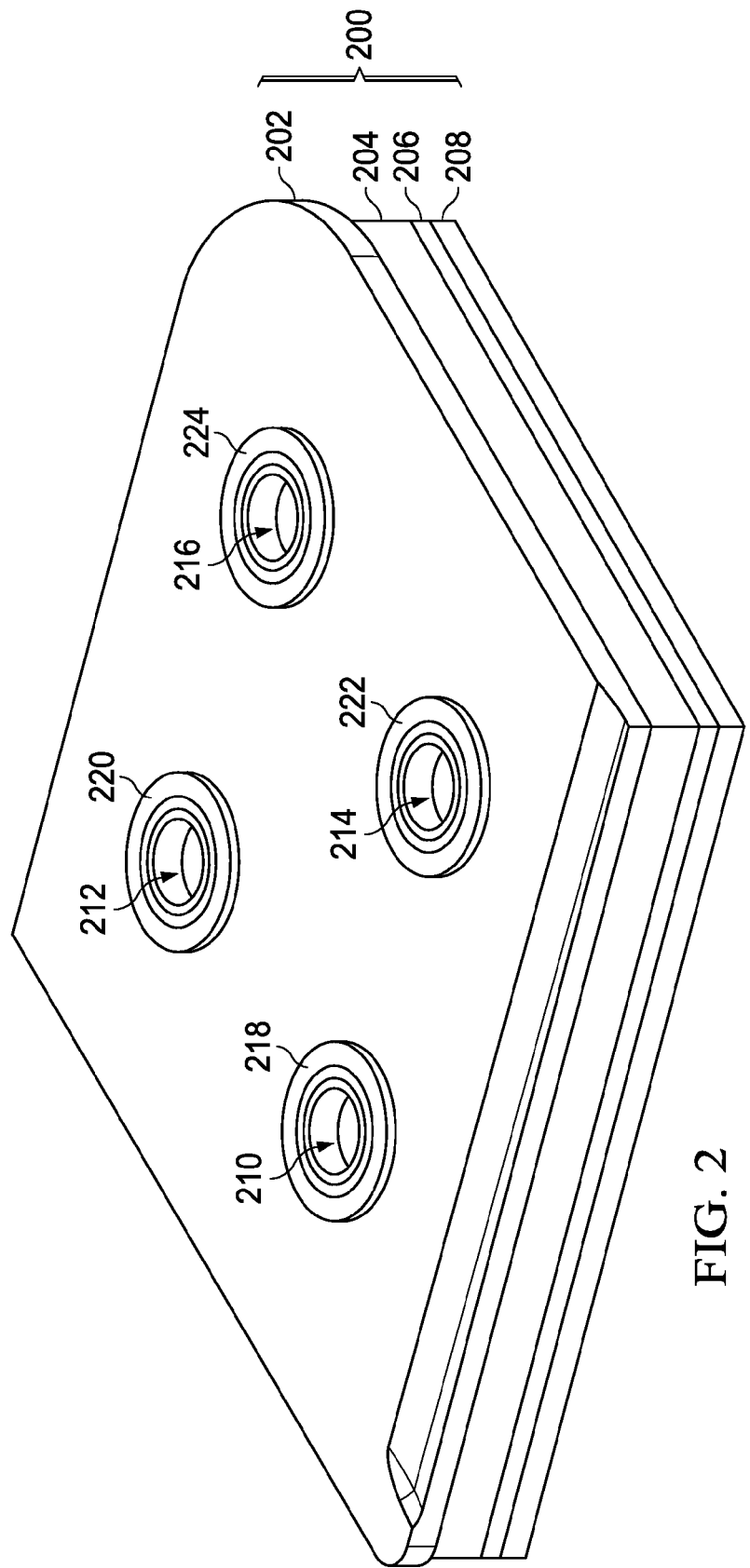
FIG. 2 is an illustration of a stackup of parts in accordance with an illustrative example.

With reference now to FIG. 2, an illustration of a stackup of parts is depicted in accordance with an illustrative example. In FIG. 2, stackup of parts 200 is an example of one implementation for stackup of parts 104 in FIG. 1. As depicted, stackup of parts 200 includes parts 202, 204, 206, and 208. Part 202 may be an example of one implementation for part 102 in FIG. 1.

In this illustrative example, part 202 has initial openings 210, 212, 214, and 216 in part 202. These initial openings in part 202 may be an example of one implementation for plurality of initial openings 110 in part 102 in FIG. 1.

As depicted, initial openings 210, 212, 214, and 216 may be lined with sleeves 218, 220, 222, and 224, respectively. In this manner, initial openings 210, 212, 214, and 216 in part 202 are openings through sleeves 218, 220, 222, and 224, respectively. In other examples of part 202, the sleeves may be omitted.

Sleeves 218, 220, 222, and 224 may be comprised of a material selected such that portions of these sleeves may be removed by drilling and/or other types of cutting operations. For example, material from sleeve 218 may be removed during the drilling operation such that the size of initial opening 210 may be increased.

Figure 3:
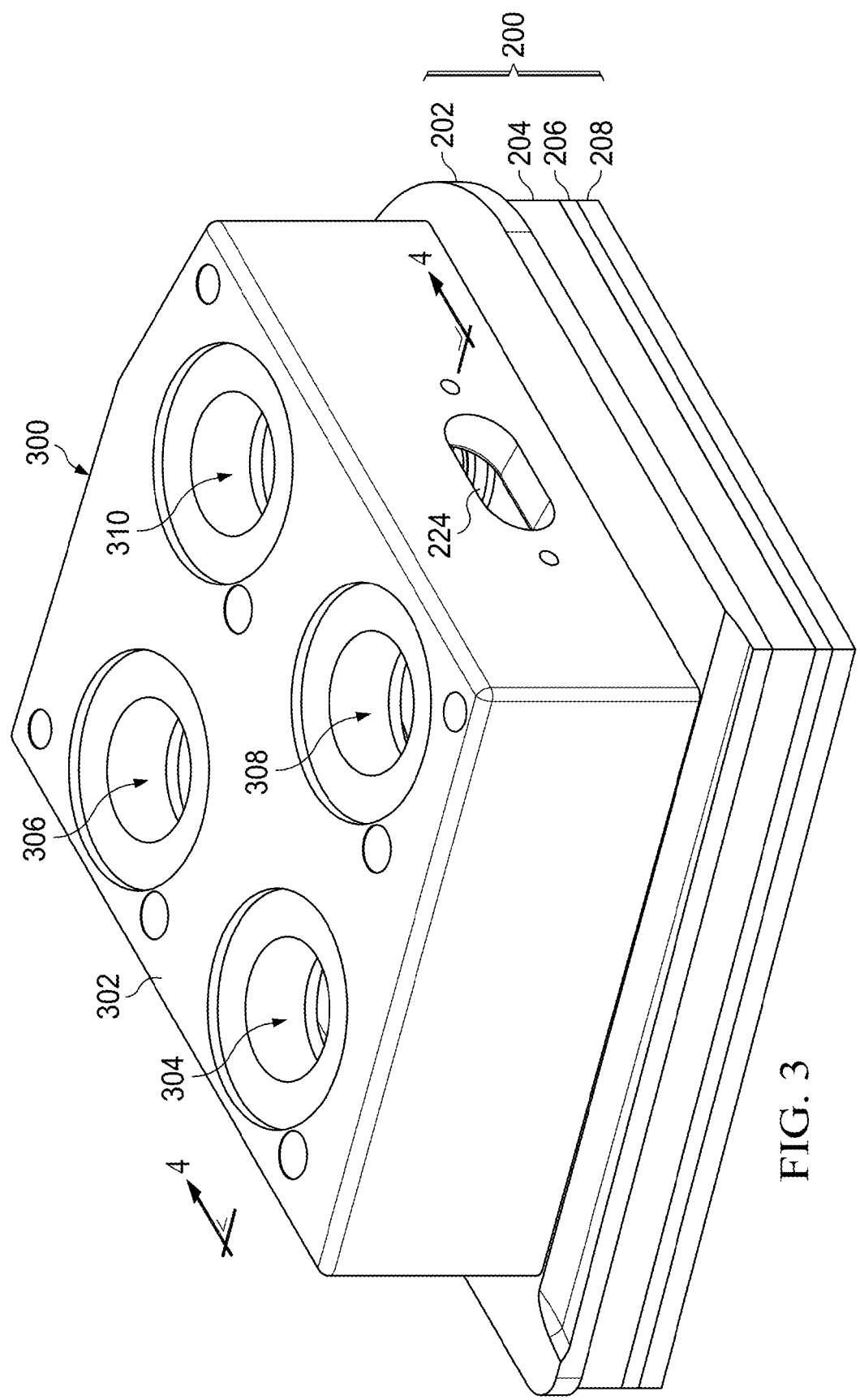
FIG. 3 is an illustration of a structure in an alignment system positioned proximate the stackup of parts in accordance with an illustrative example.

Turning now to FIG. 3, an illustration of a structure in an alignment system positioned proximate stackup of parts 200 from FIG. 2 is depicted in accordance with an illustrative example. In FIG. 3, alignment system 300 is an example of one implementation for alignment system 112 in FIG. 1. Only a portion of the components that form alignment system 300 are shown in FIG. 3.

Alignment system 300 includes structure 302. Structure 302 is an example of one implementation for structure 114 in FIG. 1. Structure 302 has openings 304, 306, 308, and 310. Openings 304, 306, 308, and 310 in structure 302 are examples of one implementation for plurality of openings 120 in structure 114 in FIG. 1.

In this illustrative example, structure 302 has been positioned proximate to part 202 in stackup of parts 200. In particular, structure 302 has been positioned proximate to part 202 such that openings 304, 306, 308, and 310 in structure 302 are positioned over initial openings 210, 212, 214, and 216, respectively, through part 202 in FIG. 2, so that the pattern of openings in structure 302 does not deviate from the pattern of initial openings outside of selected tolerances.

Figure 4:
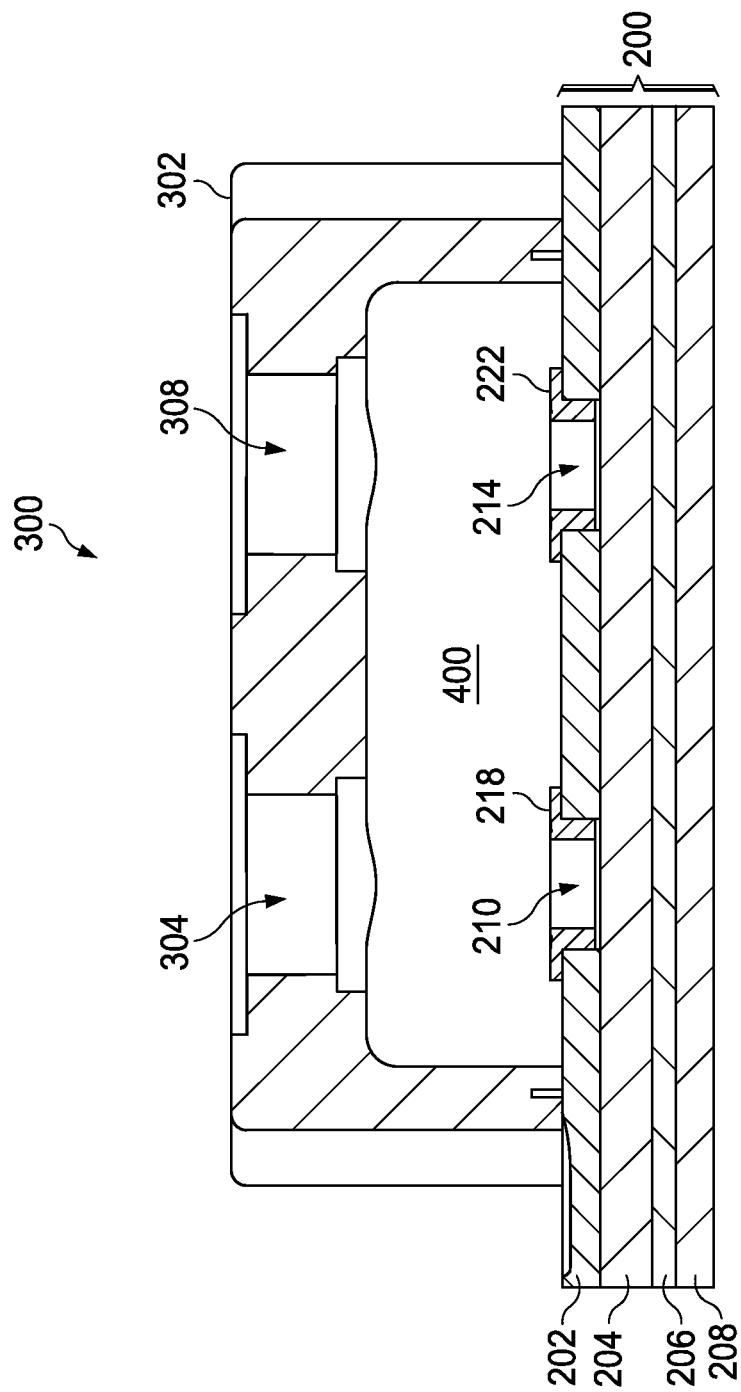
FIG. 4 is an illustration of a cross-sectional view of the structure positioned over the stackup of parts in accordance with an illustrative example.

With reference now to FIG. 4, an illustration of a cross-sectional view of structure 302 positioned over stackup of parts 204 from FIG. 3 is depicted in accordance with an illustrative example. In particular, in FIG. 4, a cross-sectional view of structure 302 positioned over stackup of parts 200 is depicted taken along lines 4-4 in FIG. 3. As depicted, structure 302 has hollow portion 400.

Figure 5:
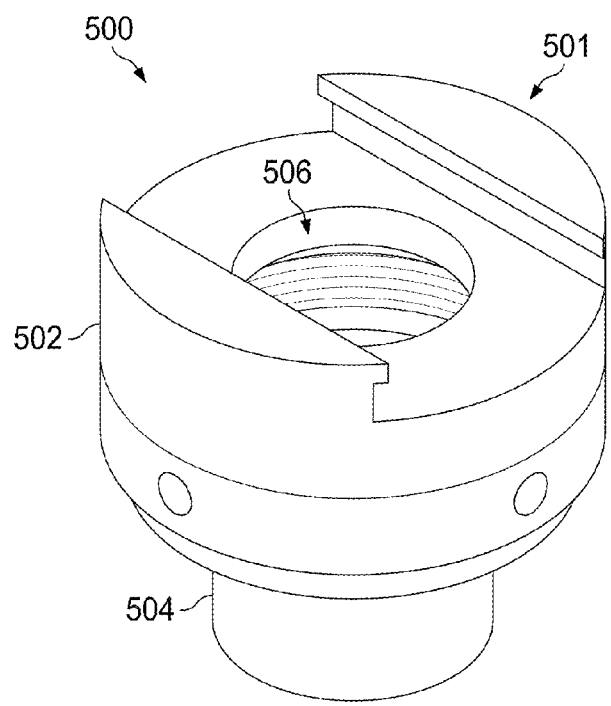
FIG. 5 is an illustration of a bushing assembly in accordance with an illustrative example.

With reference now to FIG. 5, an illustration of a bushing assembly is depicted in accordance with an illustrative example. In this illustrative example, bushing assembly 500 may be an example of one implementation for bushing assembly 122 in FIG. 1. Bushing assembly 500 may be configured for association with structure 302 within any one of openings 304, 306, 308, and 310 in structure 302 in FIG. 3. In other words, bushing assembly 500 may be configured for installation and association within any one of openings 304, 306, 308, and 310 in structure 302 in FIG. 3.

As depicted, bushing assembly 500 includes locking mechanism 501. Locking mechanism 501 is an example of one implementation for locking mechanism 142 in FIG. 1. Locking mechanism 501 takes the form of a clamping device in this illustrative example.

Locking mechanism 501 includes first component 502 and second component 504. First component 502 and second component 504 may be examples of implementations for first component 144 and second component 146, respectively, in FIG. 1.

In this illustrative example, bushing assembly 500 has hollow portion 506. Hollow portion 506 extends through both first component 502 and second component 504.

With reference now to FIGS. 6-21, illustrations of various configurations for bushing assembly 500 from FIG. 5 are shown in accordance with illustrative examples. FIGS. 6-21 include illustrations of different views of these various configurations for bushing assembly 500 and illustrations of the associations of these various configurations for bushing assembly 500 with structure 302 in alignment system 300 from FIG. 3.

Figure 6:
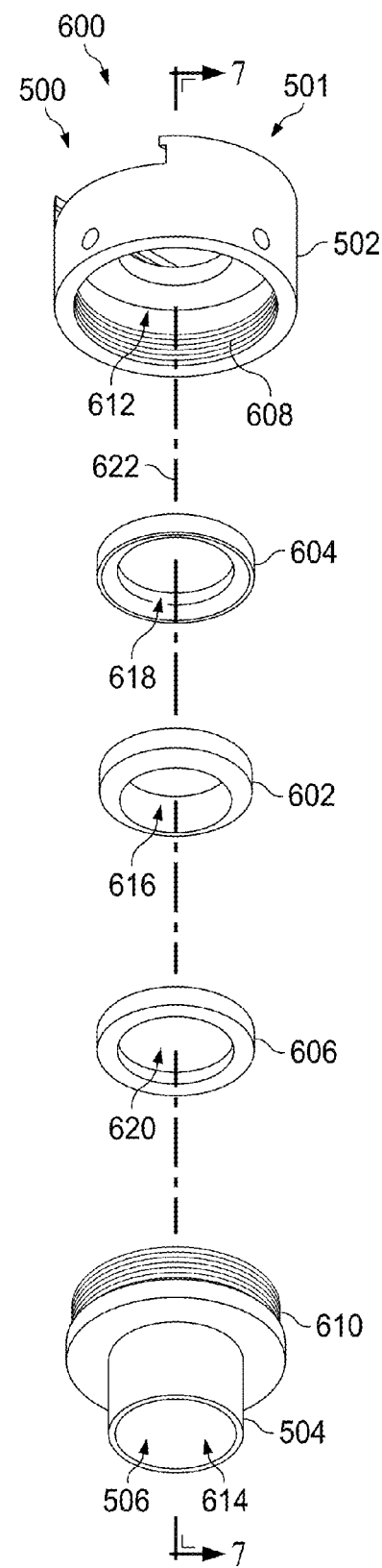
FIG. 6 is an illustration of an exploded isometric view of one configuration for the bushing assembly in accordance with an illustrative example.

With reference now to FIG. 6, an illustration of an exploded isometric view of one configuration for bushing assembly 500 in FIG. 5 is depicted in accordance with an illustrative example. In FIG. 6, bushing assembly 500 has configuration 600. With configuration 600, bushing assembly 500 includes first component 502, second component 504, core bushing 602, first bushing 604, and second bushing 606. Core bushing 602, first bushing 604, and second bushing 606 are examples of implementations for core element 130, first element 126, and second element 128, respectively, in FIG. 1.

As depicted, core bushing 602 is located between first bushing 604 and second bushing 606. Core bushing 602, first bushing 604, and second bushing 606 are configured to be enclosed within locking mechanism 501 when bushing assembly 500 is held in a fixed state by locking mechanism 501.

In this illustrative example, first component 502 has threads 608 and second component 504 has threads 610. In this manner, first component 502 is a first threaded component and second component 504 is a second threaded component.

When first component 502 is threadingly engaged with second component 504, locking mechanism 501 holds bushing assembly 500 in a fixed state. When first component 502 and second component 504 are engaged, these components have zero degrees of freedom relative to each other. When first component 502 is threadingly disengaged from second component 504, bushing assembly 500 is in a free state.

With configuration 600 for bushing assembly 500, hollow portion 506 of bushing assembly 500 is formed by opening 612 in first component 502, opening 614 in second component 504, opening 616 in core bushing 602, opening 618 in first bushing 604, and opening 620 in second bushing 606.

Center axis 622 may be a center axis through bushing assembly 500. Center axis 622 may be a center axis through opening 612 in first component 502, opening 614 in second component 504, opening 618 in first bushing 604, and opening 620 in second bushing 606. When bushing assembly 500 is in a free state, core bushing 602 may be moved such that the center axis through opening 616 in core bushing 602 is rotated and/or translated relative to center axis 622 through bushing assembly 500.

Figure 7:
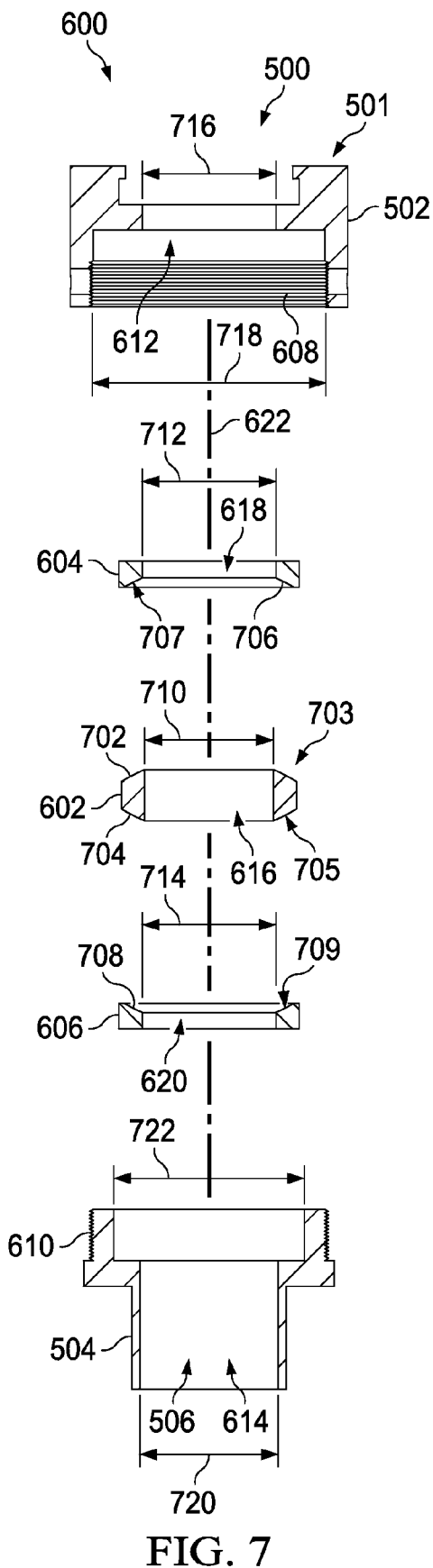
FIG. 7 is an illustration of a cross-sectional view of a configuration for bushing assembly in accordance with an illustrative example.

With reference now to FIG. 7, an illustration of a cross-sectional view of configuration 600 for bushing assembly 500 from FIG. 6 is depicted in accordance with an illustrative example. In FIG. 7, a cross-sectional view of configuration 600 for bushing assembly 500 from FIG. 6 is depicted taken along lines 7-7.

In this illustrative example, core bushing 602 has first contact surface 702 with spherical convex shape 703 and second contact surface 704 with spherical convex shape 705. First bushing 604 has first bearing surface 706 with spherical concave shape 707. Second bushing 606 has second bearing surface 708 with spherical concave shape 709.

Further, as depicted, opening 616 in core bushing 602, opening 618 in first bushing 604, and opening 620 in second bushing 606 have diameter 710, diameter 712, and diameter 714, respectively. Diameter 712 and diameter 714 are substantially equal in this illustrative example. Further, diameter 712 and diameter 714 are larger than diameter 710 of opening 616 in core bushing 602 in this illustrative example.

Additionally, a first hollow portion of first component 502 has diameter 716 and a second hollow portion of first component 502 has diameter 718. In this illustrative example, diameter 716 is at least the same size as diameter 712 of opening 618 in first bushing 604 and diameter 714 of opening 620 in second bushing 606. Diameter 718 is larger than the outer diameter of first bushing 604. In this manner, first bushing 604 may be allowed to move in a direction substantially perpendicular to center axis 622 within the second hollow portion of first component 502.

Similarly, a first portion of second component 504 has diameter 720 and a second portion of first component 502 has diameter 722. In this illustrative example, diameter 720 is at least the same size as diameter 712 of opening 618 in first bushing 604 and diameter 714 of opening 620 in second bushing 606. Diameter 722 is larger than the outer diameter of second bushing 606. In this manner, second bushing 606 may be allowed to move in a direction substantially perpendicular to center axis 622 within the second hollow portion of second component 504.

Figure 8:
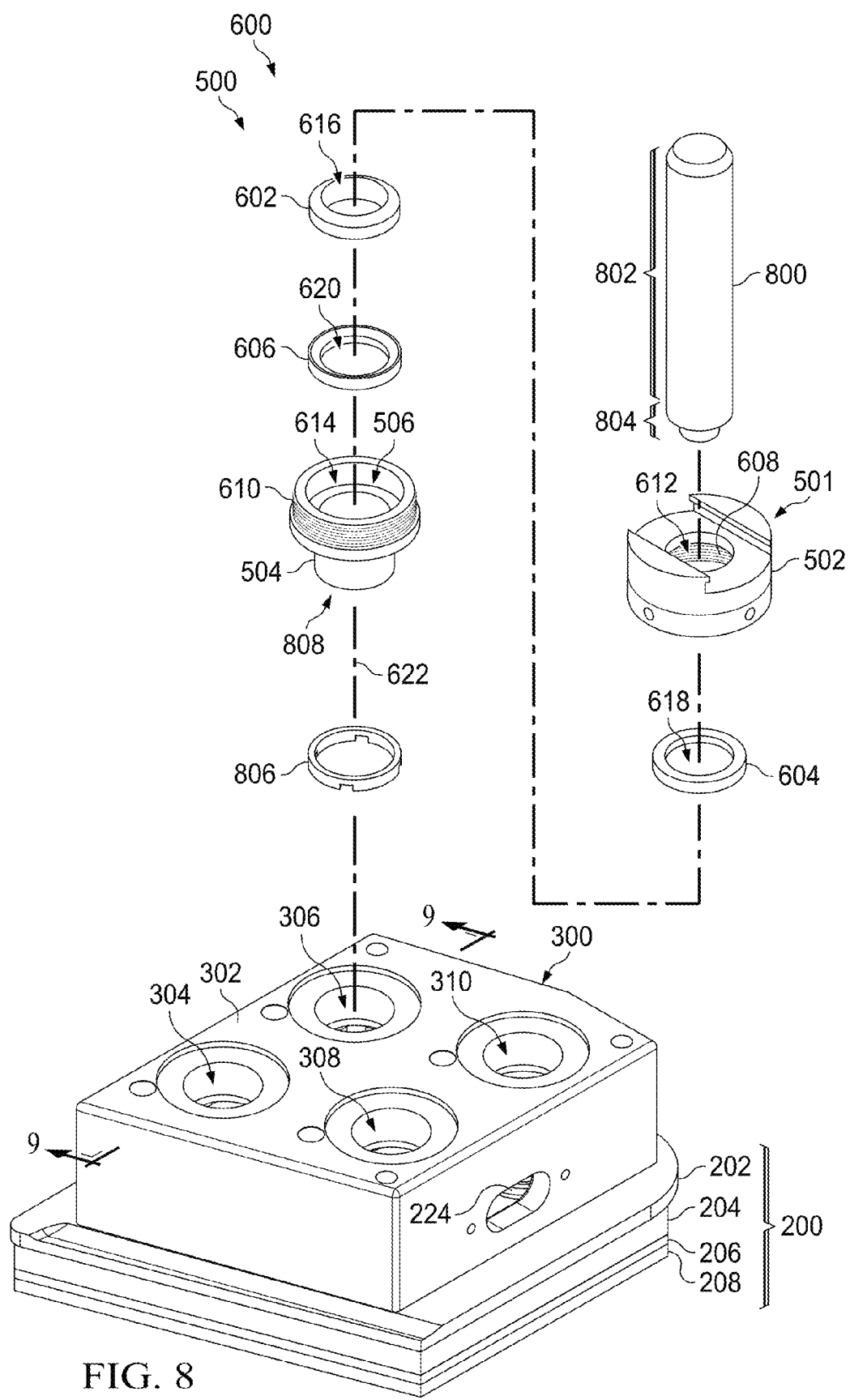
FIG. 8 is an illustration of an exploded isometric view of an alignment system using the bushing assembly with a configuration in accordance with an illustrative example.

Turning now to FIG. 8, an illustration of an exploded isometric view of alignment system 300, using bushing assembly 500 with configuration 600 from FIG. 6, positioned over stackup of parts 200 from FIG. 2 is depicted in accordance with an illustrative example. As depicted, alignment system 300 includes elongate member 800. Elongate member 800 is configured to be inserted through hollow portion 506 of bushing assembly 500.

In this illustrative example, elongate member 800 comprises first portion 802 and second portion 804. Second portion 804 of elongate member 800 has a smaller diameter than first portion 802 of elongate member 800. The diameter of second portion 804 of elongate member 800 may be configured to be substantially equal to the diameter of the portion of a tool configured for use in forming final holes.

The diameter of first portion 802 is chosen such that first portion 802 of elongate member 800 may form a sliding fit with opening 616 in core bushing 602. The diameter of second portion 804 is chosen such that second portion 804 may fit within each of initial openings 210, 212, 214, and 216 (not shown in this view) in part 202, also with a sliding fit.

In an illustrative example, diameter 710 of core bushing 602 may be about 0.002 inches greater than the diameter of first portion 802 of elongate member 800. This amount of clearance between diameter 710 of core bushing 602 and the diameter of first portion 802 of elongate member 800 forms a sliding fit between core bushing 602 and elongate member 800.

In an illustrative example, diameter 712 of first bushing 604 may be about 4 percent greater than the diameter of first portion 802 of elongate member 800. Further, diameter 714 of second bushing 606 may be about 4 percent greater than the diameter of first portion 802 of elongate member 800.

Additionally, diameter 716 of first component 502 may be about 8 percent greater than the diameter of first portion 802 of elongate member 800. Diameter 720 of second component 504 may be about 8 percent greater than the diameter of first portion 802 of elongate member 800.

In this illustrative example, fastener 806 may be used to associate end 808 of second component 504 with structure 302 within opening 306. In other words, fastener 806 may be used to keep second component 504, and thereby bushing assembly 500, located within opening 306 of structure 302.

Figure 9:
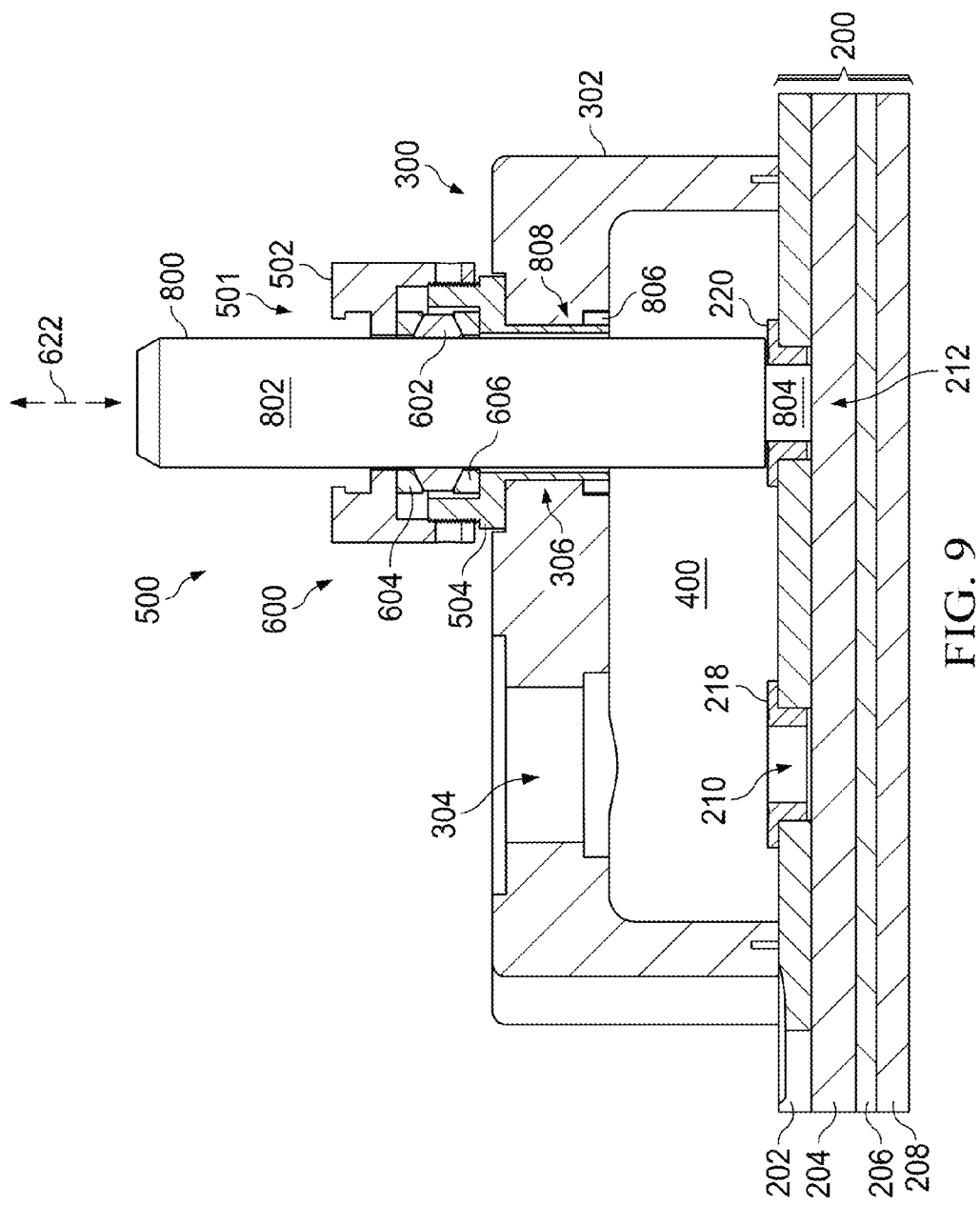
FIG. 9 is an illustration of a cross-sectional view of an alignment system positioned adjacent the stackup of parts in accordance with an illustrative example.

Turning now to FIG. 9, an illustration of a cross-sectional view of alignment system 300 positioned adjacent stackup of parts 200 from FIG. 8 is depicted in accordance with an illustrative example. In particular, a cross-sectional view of alignment system 300 positioned adjacent stackup of parts 200 from FIG. 8 when bushing assembly 500 is assembled and elongate member 800 has been inserted through hollow portion 506 of bushing assembly 500 taken along lines 9-9 in FIG. 8.

As depicted, second portion 804 of elongate member 800 has been inserted into initial opening 212. Elongate member 800 is used to concentrically align core bushing 602 with initial opening 212. For example, when initial opening 212 is at an angle offset from a normal axis through part 202, insertion of elongate member 800 into initial opening 212 and the accompanying concentric alignment of elongate member 800 with initial opening 212 causes core bushing 602 to rotate such that it also becomes concentrically aligned with initial opening 212.

In another example, when a center axis through initial opening 212 is offset from center axis 622 through bushing assembly 500, core bushing 602 may be translated in a direction substantially perpendicular to center axis 622 through bushing assembly 500 such that elongate member 800 and core bushing 602 concentrically align with initial opening 212.

Figure 10:
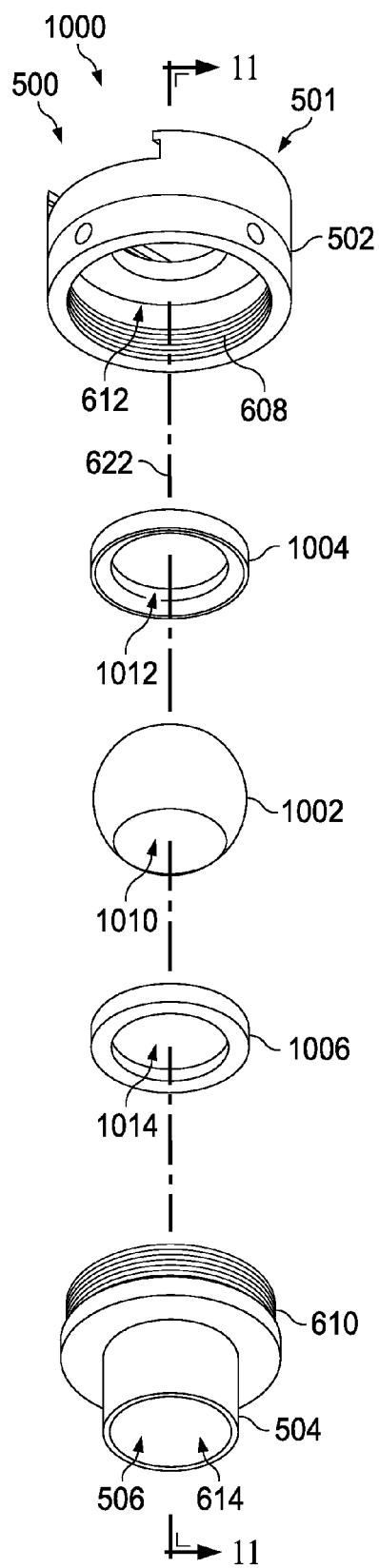
FIG. 10 is an illustration of an exploded isometric view of another configuration for bushing assembly in accordance with an illustrative example.

With reference now to FIG. 10, an illustration of an exploded isometric view of another configuration for bushing assembly 500 in FIG. 5 is depicted in accordance with an illustrative example. In FIG. 10, bushing assembly 500 has configuration 1000. With configuration 1000, bushing assembly 500 includes first component 502, second component 504, core bushing 1002, first bushing 1004, and second bushing 1006. Core bushing 1002, first bushing 1004, and second bushing 1006 are examples of implementations for core element 130, first element 126, and second element 128, respectively, in FIG. 1.

As depicted, core bushing 1002 is located between first bushing 1004 and second bushing 1006. Core bushing 1002, first bushing 1004, and second bushing 1006 are configured to be enclosed within locking mechanism 501 when bushing assembly 500 is held in a fixed state by locking mechanism 501.

With configuration 1000 for bushing assembly 500, hollow portion 506 of bushing assembly 500 is formed by opening 612 in first component 502, opening 614 in second component 504, opening 1010 in core bushing 1002, opening 1012 in first bushing 1004, and opening 1014 in second bushing 1006.

Figure 11:
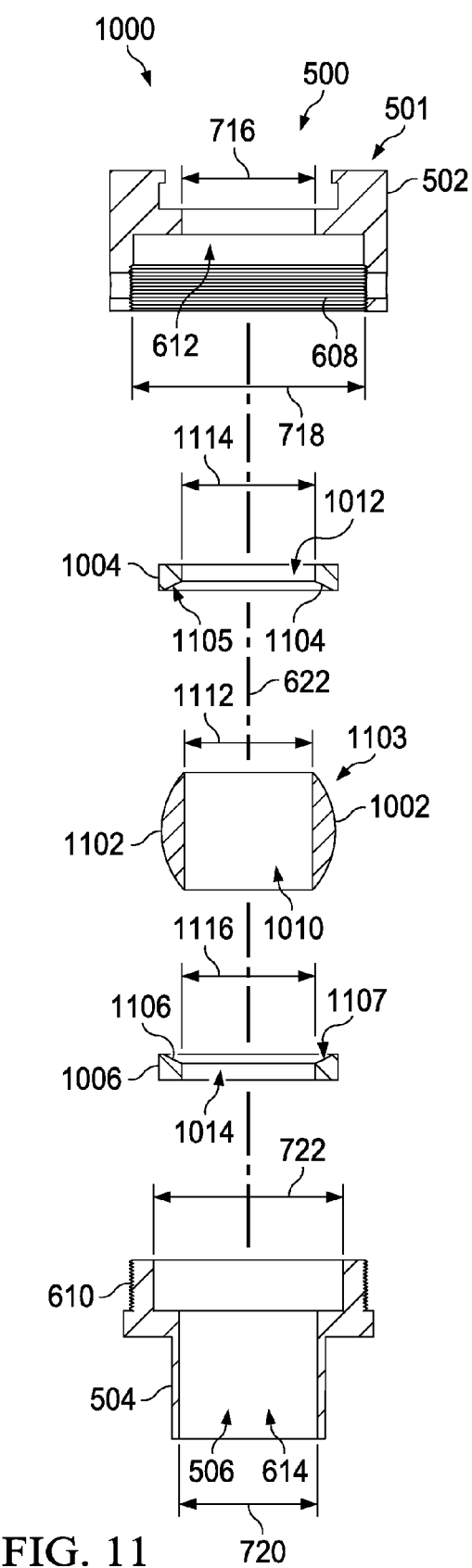
FIG. 11 is an illustration of a cross-sectional view of the configuration for the bushing assembly in accordance with an illustrative example.

With reference now to FIG. 11, an illustration of a cross-sectional view of configuration 1000 for bushing assembly 500 from FIG. 10 is depicted in accordance with an illustrative example. In FIG. 11, a cross-sectional view of configuration 1000 for bushing assembly 500 from FIG. 10 is depicted taken along lines 11-11.

In this illustrative example, core bushing 1002 has contact surface 1102 including spherical portion 1103. First bushing 1004 has first bearing surface 1104 with spherical concave shape 1105. Second bushing 1006 has second bearing surface 1106 with spherical concave shape 1107.

Further, as depicted, opening 1010 in core bushing 1002, opening 1012 in first bushing 1004, and opening 1014 in second bushing 1006 have diameter 1112, diameter 1114, and diameter 1116, respectively. Diameter 1114 and diameter 1116 are substantially equal in this illustrative example. Further, diameter 1114 and diameter 1116 are larger than diameter 1112 of opening 1010 in core bushing 1002 in this illustrative example.

Diameter 716 of the first hollow portion of first component 502 is at least the same size as diameter 1114 of opening 1012 in first bushing 1004 and diameter 1116 of opening 1014 in second bushing 1006. Diameter 718 of the second hollow portion of first component 502 is larger than the outer diameter of first bushing 1004. In this manner, first bushing 1004 may be allowed to move in a direction substantially perpendicular to center axis 622 within the second hollow portion of first component 502.

Similarly, diameter 720 of the first hollow portion of second component 504 is at least the same size as diameter 1114 of opening 1012 in first bushing 1004 and diameter 1116 of opening 1014 in second bushing 1006. Diameter 722 of the second hollow portion of second component 504 is larger than the outer diameter of second bushing 1006. In this manner, second bushing 1006 may be allowed to move in a direction substantially perpendicular to center axis 622 within the second hollow portion of second component 504.

Figure 12:
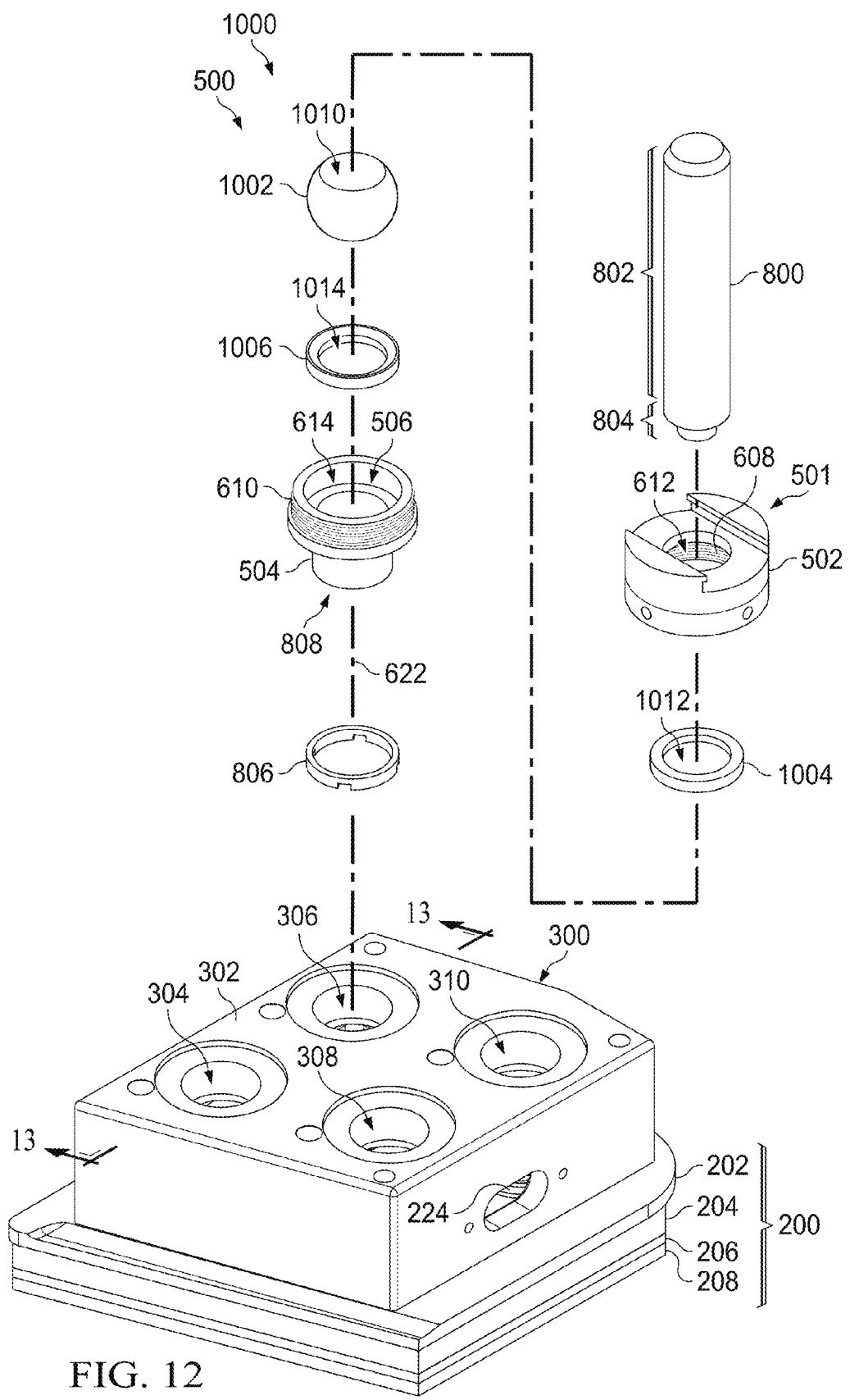
FIG. 12 is an illustration of an exploded isometric view of the alignment system using the bushing assembly positioned over the stackup of parts in accordance with an illustrative example.

Turning now to FIG. 12, an illustration of an exploded isometric view of alignment system 300, using bushing assembly 500 with configuration 1000 from FIG. 10, positioned proximate to stackup of parts 200 from FIG. 2 is depicted in accordance with an illustrative example.

As depicted, elongate member 800 is configured to be inserted through hollow portion 506 of bushing assembly 500. The first portion 802 of elongate member 800 may form a sliding fit with opening 1010 in core bushing 1002.

Figure 13:
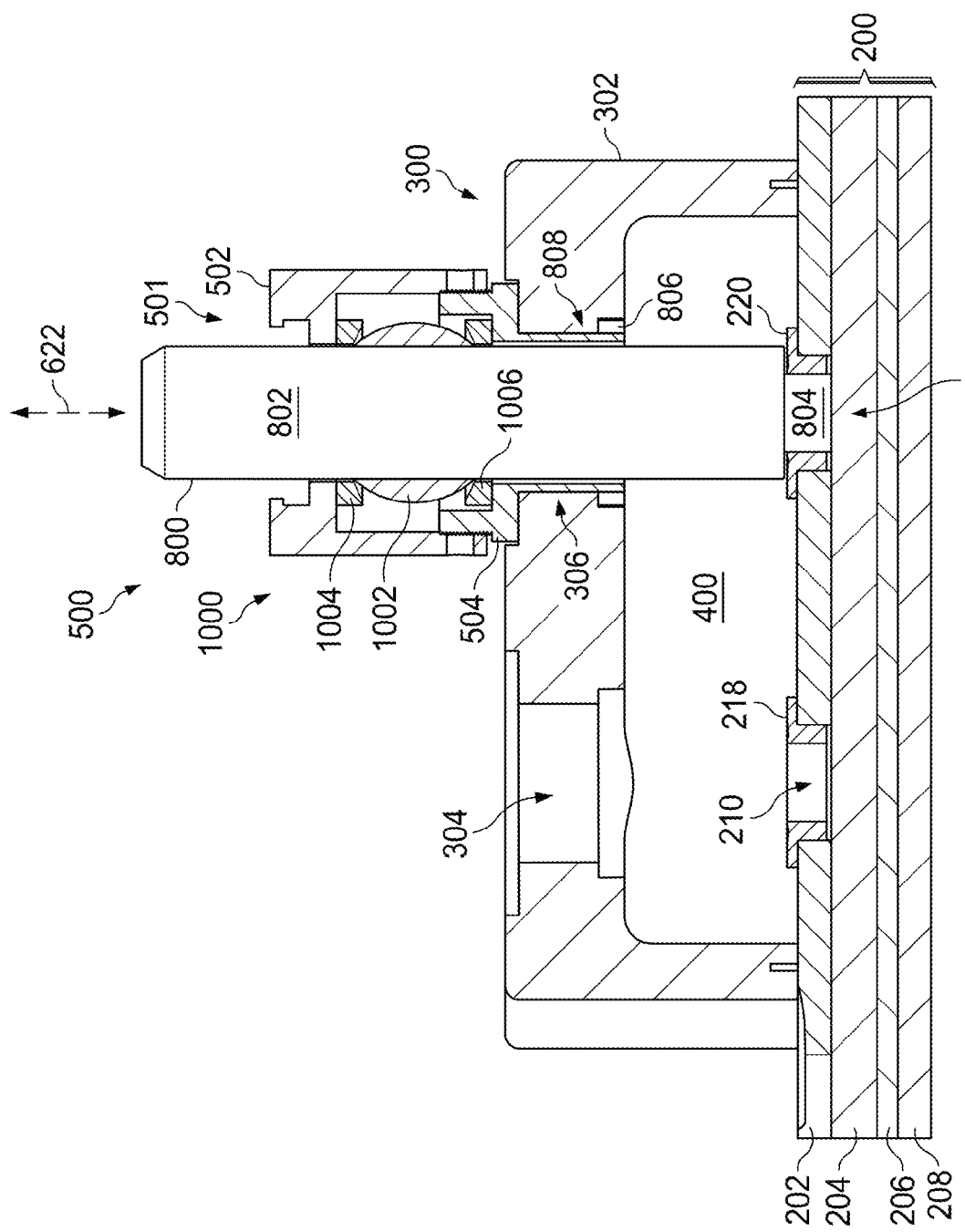
FIG. 13 is an illustration of a cross-sectional view of an alignment system positioned over the stackup of parts in accordance with an illustrative example.

Turning now to FIG. 13, an illustration of a cross-sectional view of alignment system 300 positioned over stackup of parts 200 from FIG. 12 is depicted in accordance with an illustrative example. In particular, a cross-sectional view of alignment system 300 positioned over stackup of parts 200 from FIG. 12 when bushing assembly 500 is assembled and elongate member 800 has been inserted through hollow portion 506 of bushing assembly 500 taken along lines 13-13 in FIG. 12.

As depicted, second portion 804 of elongate member 800 has been inserted into initial opening 212. Elongate member 800 is used to concentrically align opening 1010 in core bushing 1002 with initial opening 212 in part 202. Core bushing 1002 may be rotated and/or translated such that opening 1010 in core bushing 1002, and thereby, elongate member 800, concentrically align with initial opening 212.

With reference now to FIG. 14, an illustration of an exploded isometric view of another configuration for bushing assembly 500 in FIG. 5 is depicted in accordance with an illustrative example. In FIG. 14, bushing assembly 500 has configuration 1400. With configuration 1400, bushing assembly 500 includes first component 502, second component 504, core bushing 1402, and bushing 1404.

In this illustrative example, core bushing 1402, first component 502, and bushing 1404 are examples of implementations for core element 170, first element 166, and second element 168, respectively, in FIG. 1. In this manner, first component 502 functions as the first element for bushing assembly 500.

As depicted, core bushing 1402 is located between first component 502 and bushing 1404. Core bushing 1402 and bushing 1404 are configured to be enclosed within locking mechanism 501 when bushing assembly 500 is held in a fixed state by locking mechanism 501.

With configuration 1400 for bushing assembly 500, hollow portion 506 of bushing assembly 500 is formed by opening 612 in first component 502, opening 614 in second component 504, opening 1406 in core bushing 1402, and opening 1408 in bushing 1404.

With reference now to FIG. 15, an illustration of a cross-sectional view of configuration 1400 for bushing assembly 500 from FIG. 14 is depicted in accordance with an illustrative example. In FIG. 15, a cross-sectional view of configuration 1400 for bushing assembly 500 from FIG. 14 is depicted taken along lines 15-15.

In this illustrative example, core bushing 1402 has first contact surface 1502 having spherical convex shape 1503 and second contact surface 1504 having spherical convex shape 1505. First component 502 has first bearing surface 1506 with spherical concave shape 1507. Spherical concave shape 1507 may be different from the flat shape of the surface of first component 502 in FIGS. 7 and 11. Further, bushing 1404 has second bearing surface 1508 with spherical concave shape 1509.

Further, as depicted, opening 1406 in core bushing 1402 and opening 1408 in bushing 1404 have diameter 1512 and diameter 1514, respectively. Diameter 716 of the first hollow portion of first component 502 and diameter 1514 are substantially equal in this illustrative example. Further, diameter 716 and diameter 1514 are larger than diameter 1512 of opening 1406 in core bushing 1402 in this illustrative example.

Figure 16:
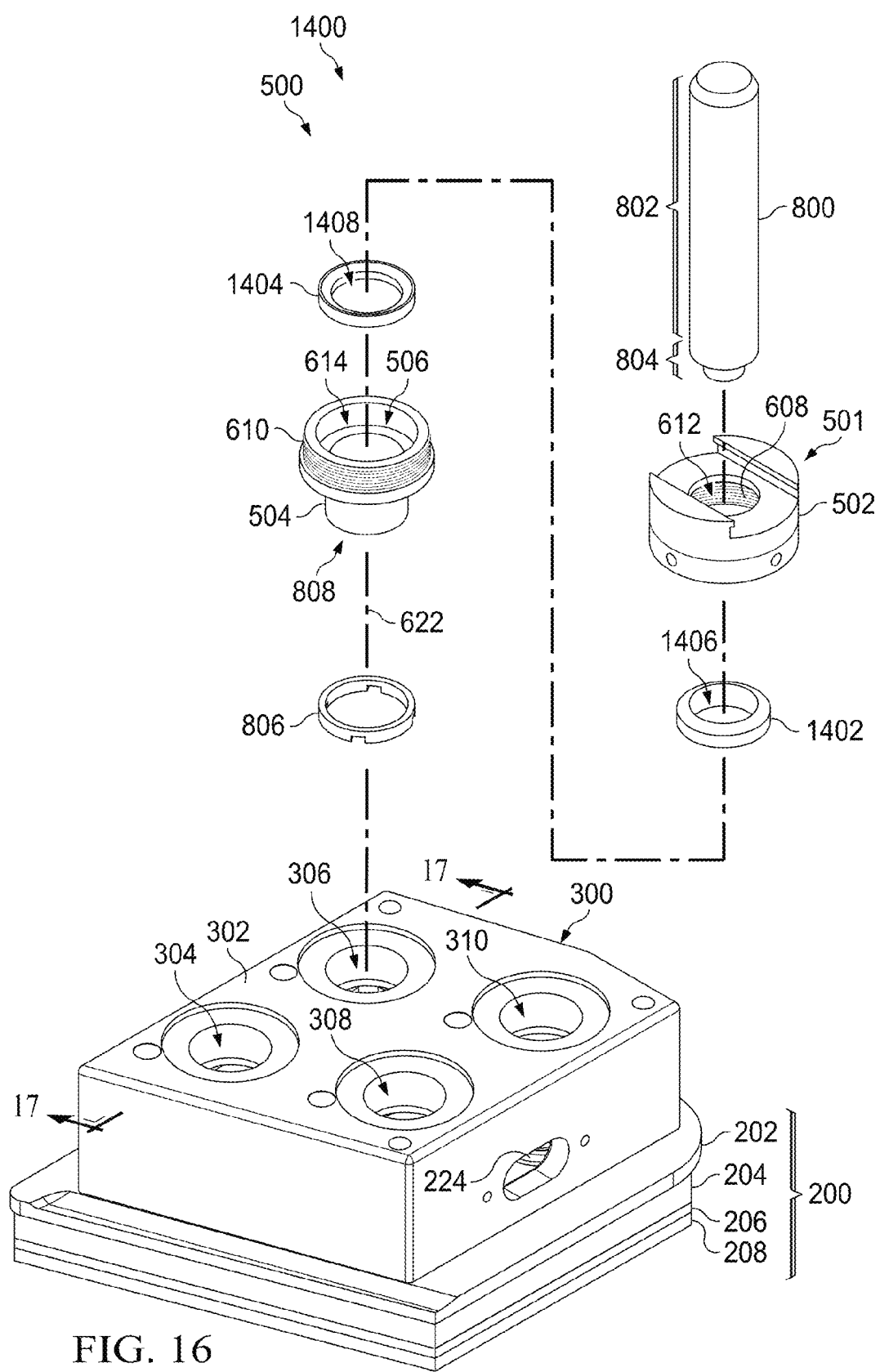
FIG. 16 is an illustration of an exploded isometric view of the alignment system using the bushing assembly with a configuration positioned over the stackup of parts in accordance with an illustrative example.

Turning now to FIG. 16, an illustration of an exploded isometric view of alignment system 300, using bushing assembly 500 with configuration 1400 from FIG. 14, positioned over stackup of parts 200 from FIG. 2 is depicted in accordance with an illustrative example.

As depicted, elongate member 800 is configured to be inserted through hollow portion 506 of bushing assembly 500. The first portion 802 of elongate member 800 may form a sliding fit with opening 1406 in core bushing 1402.

Figure 17:
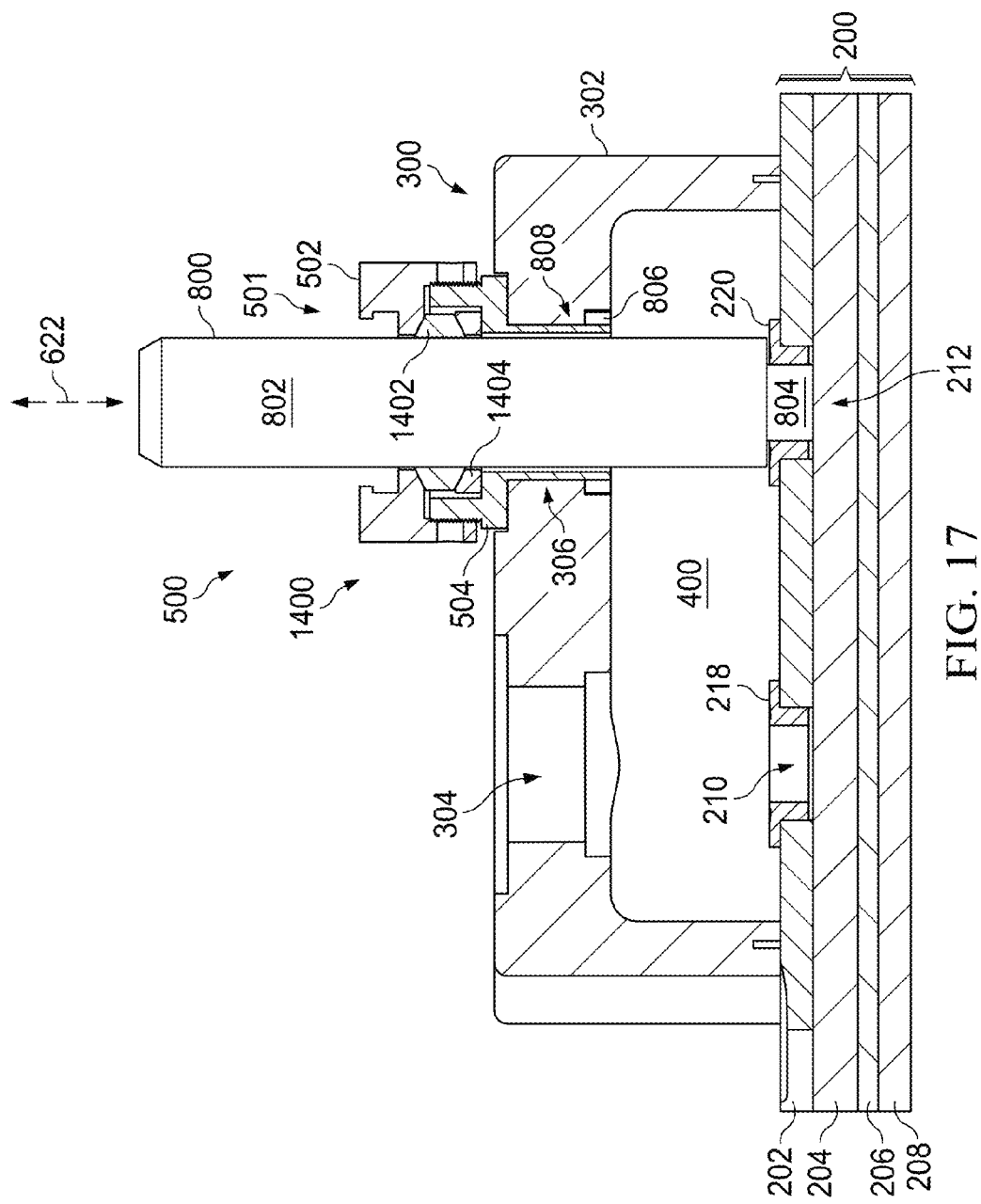
FIG. 17 is an illustration of a cross-sectional view of the alignment system positioned over the stackup of parts in accordance with an illustrative example.

Turning now to FIG. 17, an illustration of a cross-sectional view of alignment system 300 positioned adjacent to stackup of parts 200 from FIG. 16 is depicted in accordance with an illustrative example. In particular, a cross-sectional view of alignment system 300 positioned adjacent to stackup of parts 200 from FIG. 16 when bushing assembly 500 is assembled and elongate member 800 has been inserted through hollow portion 506 of bushing assembly 500 taken along lines 17-17 in FIG. 16.

As depicted, second portion 804 of elongate member 800 has been inserted into initial opening 212. Elongate member 800 is used to concentrically align opening 1406 in core bushing 1402 with initial opening 212 in part 202. Core bushing 1402 may be rotated and/or translated when elongate member 800 and, thereby, opening 1406 in core bushing 1402, concentrically align with initial opening 212.

With reference now to FIG. 18, an illustration of an exploded isometric view of still yet another configuration for bushing assembly 500 in FIG. 5 is depicted in accordance with an illustrative example. In FIG. 18, bushing assembly 500 has configuration 1800. With configuration 1800, bushing assembly 500 includes first component 502, second component 504, and core bushing 1802.

In this illustrative example, core bushing 1802, first component 502, and second component 504 are examples of implementations for core element 130, first element 126, and second element 128, respectively, in FIG. 1. In this manner, first component 502 functions as the first element for bushing assembly 500 and second component 504 functions as the second element for bushing assembly 500. No other bushings are needed.

As depicted, core bushing 1802 is located between first component 502 and second component 504. Core bushing 1802 is configured to be enclosed within locking mechanism 501 when bushing assembly 500 is held in a fixed state by locking mechanism 501. With configuration 1800 for bushing assembly 500, hollow portion 506 of bushing assembly 500 is formed by opening 612 in first component 502, opening 614 in second component 504, and opening 1804 in core bushing 1802.

With reference now to FIG. 19, an illustration of a cross-sectional view of configuration 1800 for bushing assembly 500 from FIG. 18 is depicted in accordance with an illustrative example. In FIG. 19, a cross-sectional view of configuration 1800 for bushing assembly 500 from FIG. 18 is depicted taken along lines 19-19.

In this illustrative example, core bushing 1802 has first contact surface 1902 having spherical convex shape 1903 and second contact surface 1904 having spherical convex shape 1905. First component 502 has first bearing surface 1906 with spherical concave shape 1907. Spherical concave shape 1907 may be different from the flat shape of the surface of first component 502 in FIGS. 7 and 11. Further, second component 504 has second bearing surface 1908 with spherical concave shape 1909. Spherical concave shape 1909 may be different from the flat shape of the surface of first component 502 in FIGS. 7, 11, and 15.

Further, as depicted, opening 1804 in core bushing 1802 has diameter 1910. Diameter 716 of first component 502 and diameter 720 of second component 504 may be greater than diameter 1910 of core bushing 1802. Further, diameter 718 of first component 502 and diameter 722 of second component 504 may be greater than the outer diameter of core bushing 1802.

Figure 20:
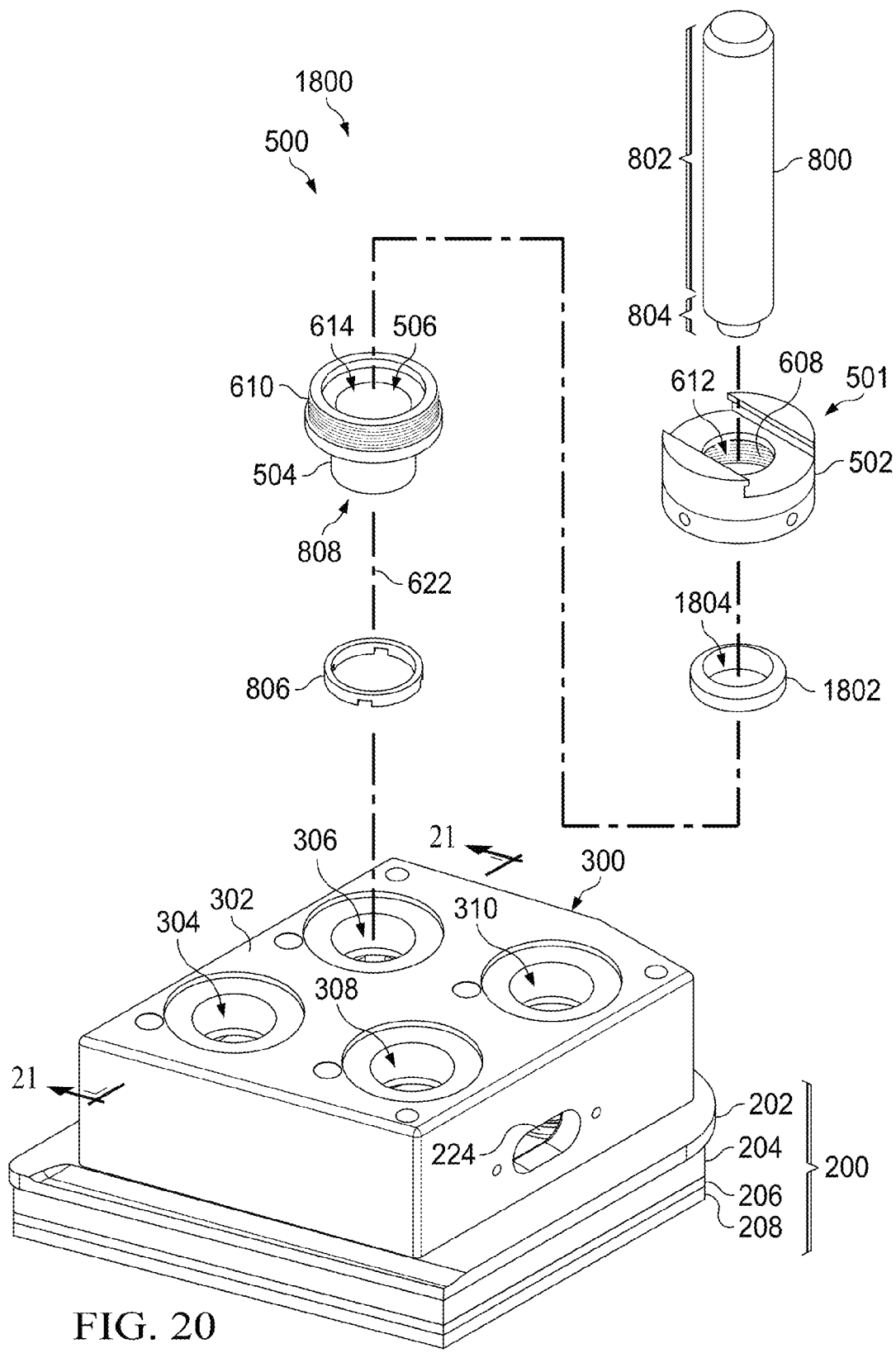
FIG. 20 is an illustration of an exploded isometric view of the alignment system using the bushing assembly with a configuration positioned over the stackup of parts in accordance with an illustrative example.

Turning now to FIG. 20, an illustration of an exploded isometric view of alignment system 300, using bushing assembly 500 with configuration 1800 from FIG. 18, positioned proximate stackup of parts 200 from FIG. 2 is depicted in accordance with an illustrative example.

As depicted, elongate member 800 is configured to be inserted through hollow portion 506 of bushing assembly 500. The first portion 802 of elongate member 800 may form a sliding fit with opening 1804 in core bushing 1802.

Figure 21:
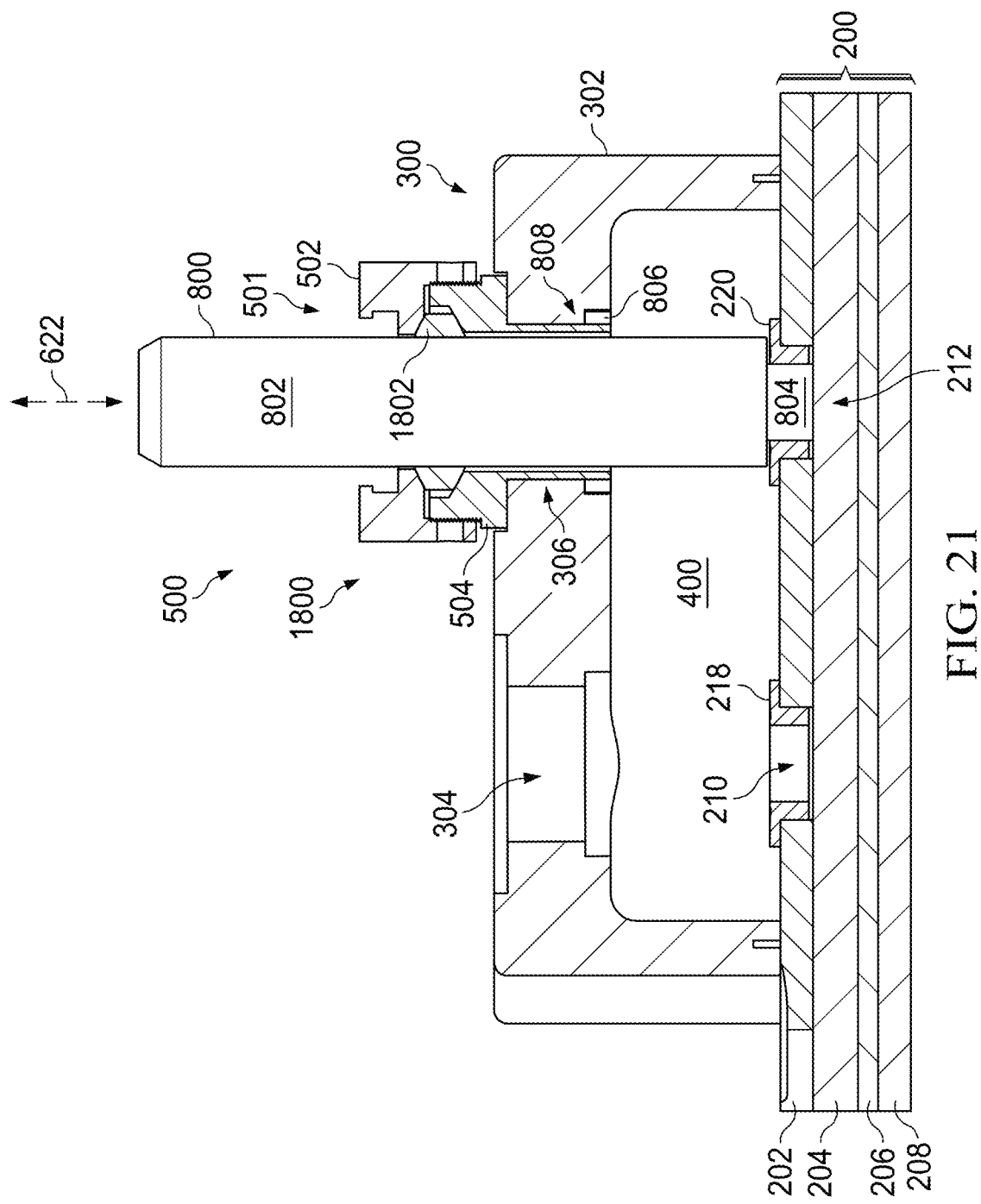
FIG. 21 is an illustration of a cross-sectional view of an alignment system positioned over the stackup of parts in accordance with an illustrative example.

Turning now to FIG. 21, an illustration of a cross-sectional view of alignment system 300 positioned proximate stackup of parts 200 from FIG. 20 is depicted in accordance with an illustrative example. In particular, a cross-sectional view of alignment system 300 positioned proximate stackup of parts 200 from FIG. 20 when bushing assembly 500 is assembled and elongate member 800 has been inserted through hollow portion 506 of bushing assembly 500 taken along lines 21-21 in FIG. 20.

As depicted, second portion 804 of elongate member 800 has been inserted into initial opening 212. Elongate member 800 is used to concentrically align opening 1804 in core bushing 1802 with initial opening 212 in part 202. Core bushing 1802 may be rotated and/or translated such that opening 1804 in core bushing 1802, and thereby, elongate member 800, concentrically aligns with initial opening 212.

Figure 22:
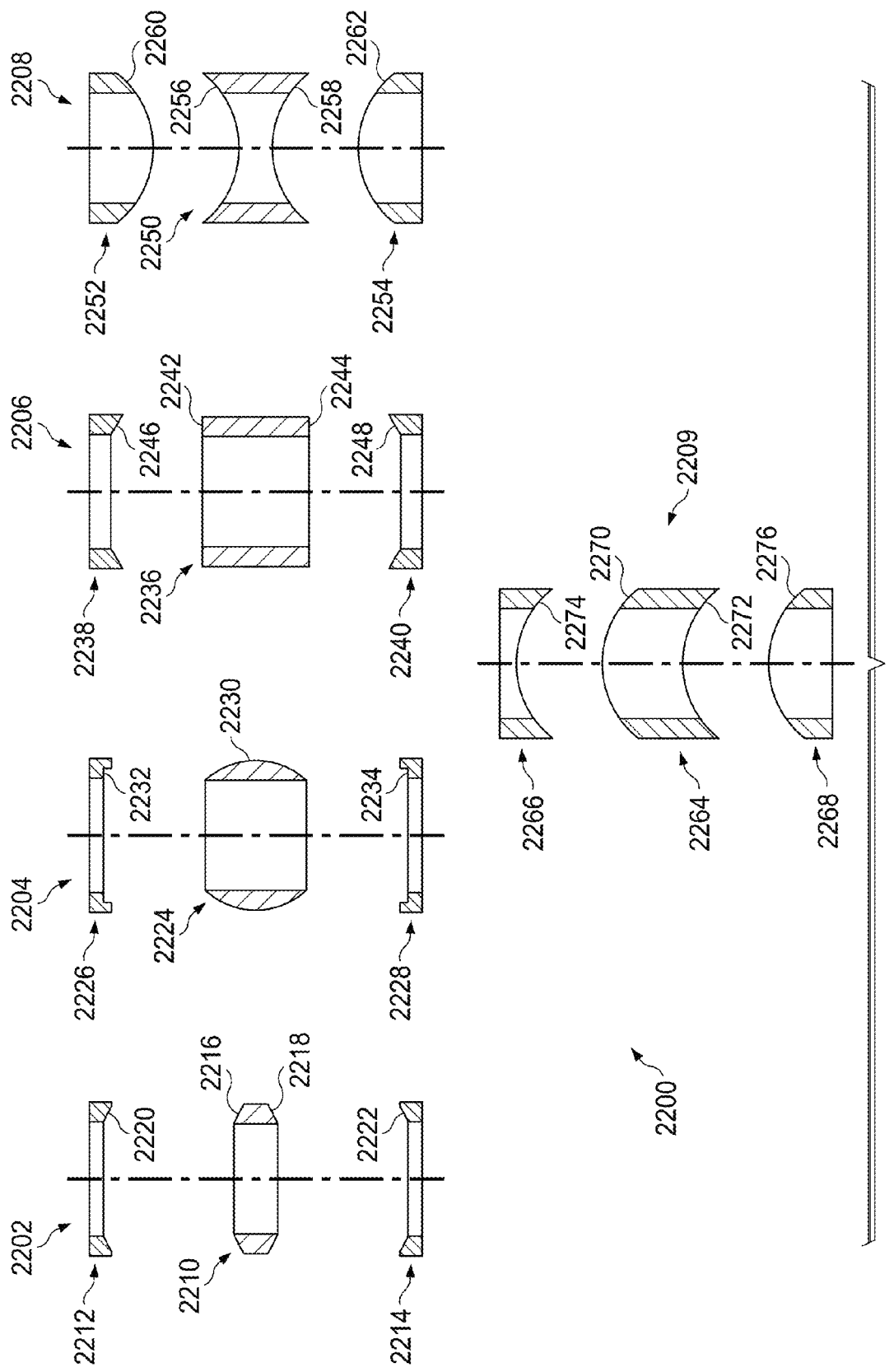
FIG. 22 is an illustration of potential configurations for a bushing assembly in accordance with an illustrative example.

With reference now to FIG. 22, an illustration of potential configurations for a bushing assembly, such as bushing assembly 500 in FIG. 5, is depicted in accordance with an illustrative example. Potential configurations 2200 for a bushing assembly include configurations 2202, 2204, 2206, 2208, and 2209.

In this illustrative example, configuration 2202 for a bushing assembly includes core element 2210 located between first element 2212 and second element 2214. Core element 2210 has first contact surface 2216 and second contact surface 2218, both of which have spherical convex shapes. First element 2212 has first bearing surface 2220 and second element 2214 has second bearing surface 2222. Both first bearing surface 2220 and second bearing surface 2222 have spherical concave shapes.

The shapes of first contact surface 2216, second contact surface 2218, first bearing surface 2220, and second bearing surface 2222 allow core element 2210 to have at least two degrees of rotational freedom when the bushing assembly is in a free state. Further, with configuration 2202, core element 2210 may be configured to have surface contact with both first bearing surface 2220 and second bearing surface 2222 when the bushing assembly is in a fixed state.

Configuration 2204 includes core element 2224 located between first element 2226 and second element 2228. Core element 2224 has a single contact surface 2230 which includes a spherical portion. First element 2226 has first bearing surface 2232 and second element 2228 has second bearing surface 2234. Both first bearing surface 2232 and second bearing surface 2234 have flanged shapes in this example.

The shapes of contact surface 2230, first bearing surface 2232, and second bearing surface 2234 allow core element 2224 to have at least two degrees of rotational freedom when the bushing assembly is in a free state. Further, with configuration 2204, core element 2224 may be configured to have line contact with both first bearing surface 2232 and second bearing surface 2234 when the bushing assembly is in a fixed state.

Configuration 2206 includes core element 2236, first element 2238, and second element 2240. Core element 2236 has first contact surface 2242 and second contact surface 2244, both of which have flat shapes. First element 2238 has first bearing surface 2246 having a spherical concave shape. Second element 2240 has second bearing surface 2248 also having a spherical concave shape.

The shapes of first contact surface 2242, second contact surface 2244, first bearing surface 2246, and second bearing surface 2248 allow core element 2236 to have at least two degrees of rotational freedom when the bushing assembly is in a free state. Further, with configuration 2206, core element 2236 may be configured to have line contact with both first bearing surface 2246 and second bearing surface 2248 when the bushing assembly is in a fixed state.

In this illustrative example, configuration 2208 includes core element 2250, first element 2252, and second element 2254. Core element 2250 has first contact surface 2256 and second contact surface 2258, both of which have spherical concave shapes. First element 2252 has first bearing surface 2260 having a spherical convex shape. Second element 2254 has second bearing surface 2262 also having a spherical convex shape.

The shapes of first contact surface 2256, second contact surface 2258, first bearing surface 2260, and second bearing surface 2262 allow core element 2250 to have at least two degrees of rotational freedom when the bushing assembly is in a free state. Further, with configuration 2208, core element 2250 may be configured to have surface contact with both first bearing surface 2260 and second bearing surface 2262 when the bushing assembly is in a fixed state.

Configuration 2209 includes core element 2264, first element 2266, and second element 2268. Core element 2264 has first contact surface 2270 and second contact surface 2272. First contact surface 2270 has a spherical convex shape, while second contact surface 2272 has a spherical concave shape. In this manner, a first contact surface of a core element and a second contact surface of the core element may have the same shapes or different shapes.

First element 2266 has first bearing surface 2274 having a spherical concave shape. Second element 2268 has second bearing surface 2276 having a spherical convex shape. In this manner, the first bearing surface and the second bearing surface may have the same shapes or different shapes.

The shapes of first contact surface 2270, second contact surface 2272, first bearing surface 2274, and second bearing surface 2276 allow core element 2264 to have at least two degrees of rotational freedom when the bushing assembly is in a free state. Further, with configuration 2209, core element 2264 may be configured to have surface contact with both first bearing surface 2274 and second bearing surface 2276 when the bushing assembly is in a fixed state.

Figure 23:
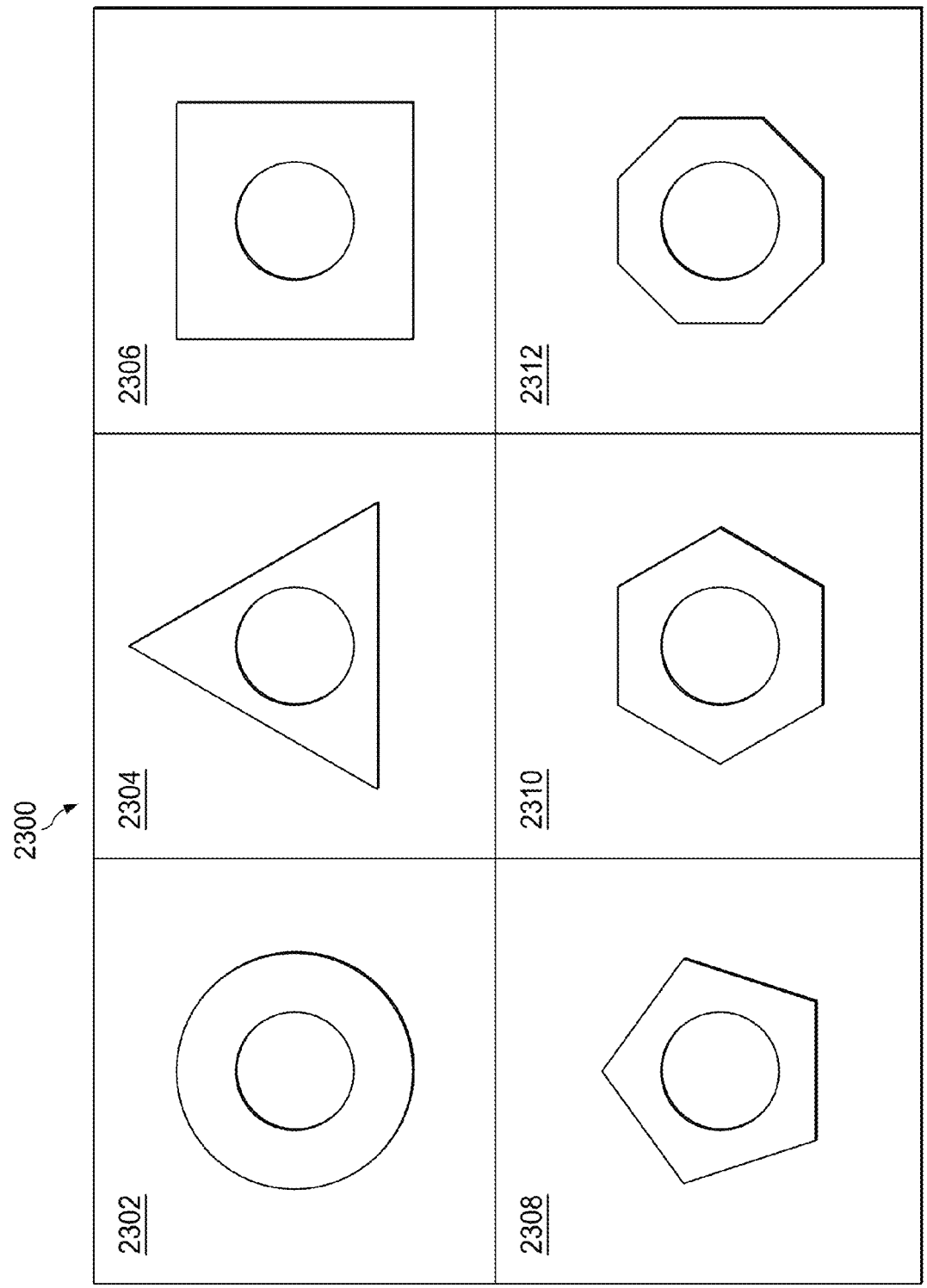
FIG. 23 is an illustration of potential shapes for a surface in accordance with an illustrative example.

With reference now to FIG. 23, an illustration of potential shapes for a surface is depicted in accordance with an illustrative embodiment. In this illustrative example, potential shapes 2300 may be potential shapes for a contact surface of a core element that has a flat shape. For example, potential shapes 2300 may be the potential shapes for first contact surface 2242 of core element 2236 and second contact surface 2244 of core element 2236 in FIG. 22. Of course, potential configurations 2300 may also be potential shapes for a bearing surface, such as a first bearing surface of a first element in a bushing assembly or a second bearing surface of a second element in the bushing assembly.

Potential shapes 2300 include circular shape 2302, triangular shape 2304, square shape 2306, pentagonal shape 2308, hexagonal shape 2310, and octagonal shape 2312. In this manner, a potential shape for a flat shape for a surface may be any one of a number of polygonal shapes.

Figure 24:
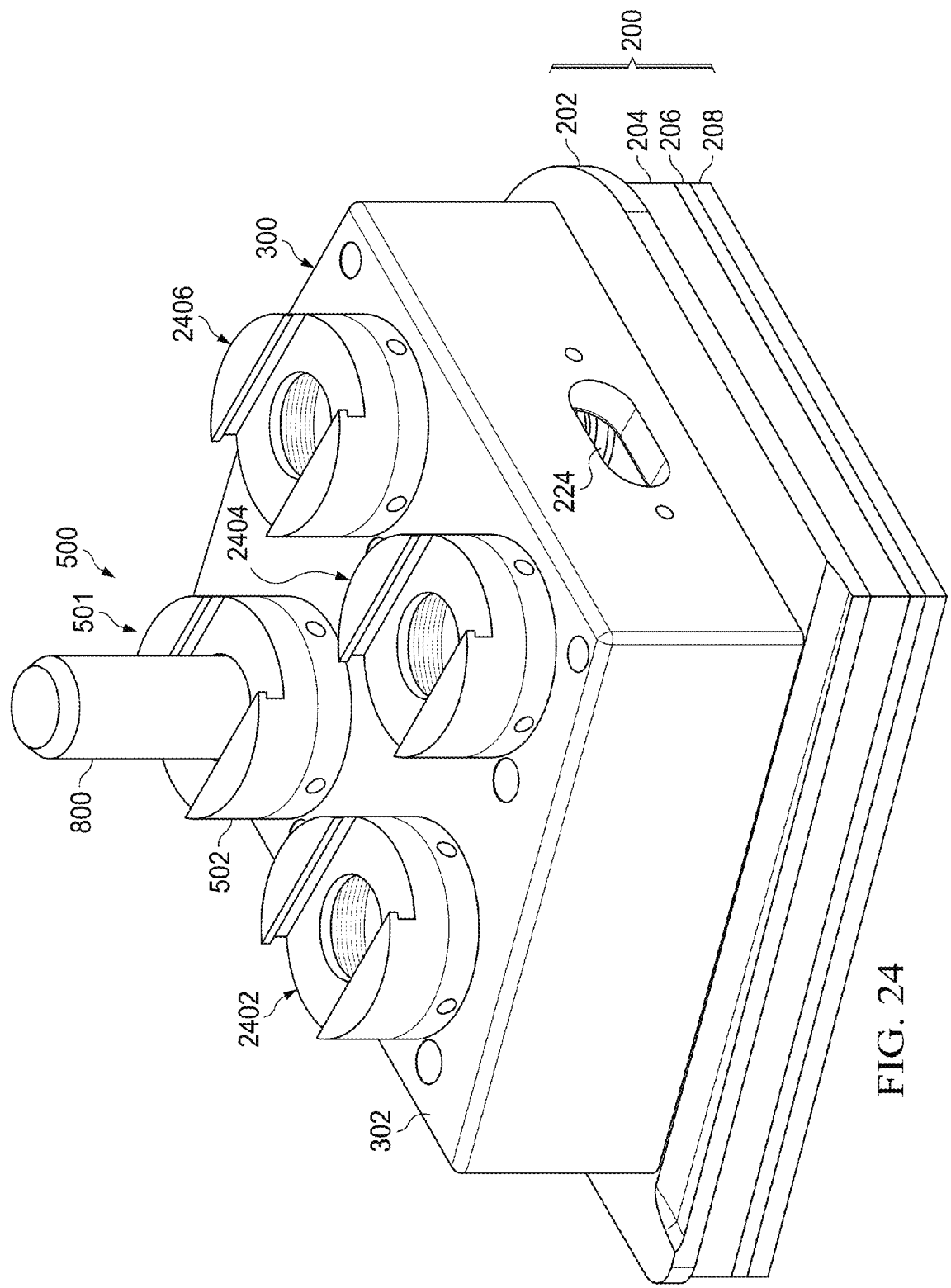
FIG. 24 is an illustration of an isometric view of the elongate member being used to concentrically align the bushing assemblies in the alignment system in accordance with an illustrative example.

With reference now to FIG. 24, an illustration of an isometric view of elongate member 800 being used to concentrically align bushing assemblies in alignment system 300 is depicted in accordance with an illustrative example. In this illustrative example, bushing assemblies 500, 2402, 2404, and 2406 have been associated with structure 302.

Further, elongate member 800 may be used with each of bushing assemblies 500, 2402, 2404, and 2406 to concentrically align a core element (not shown in this view) with a corresponding initial opening (not shown in this view) in part 202 in stackup of parts 200. Once each of the core elements is concentrically aligned with the initial opening corresponding thereto, the bushing assembly may be configured to be in the fixed state and elongate member 800 may be removed.

Figure 25:
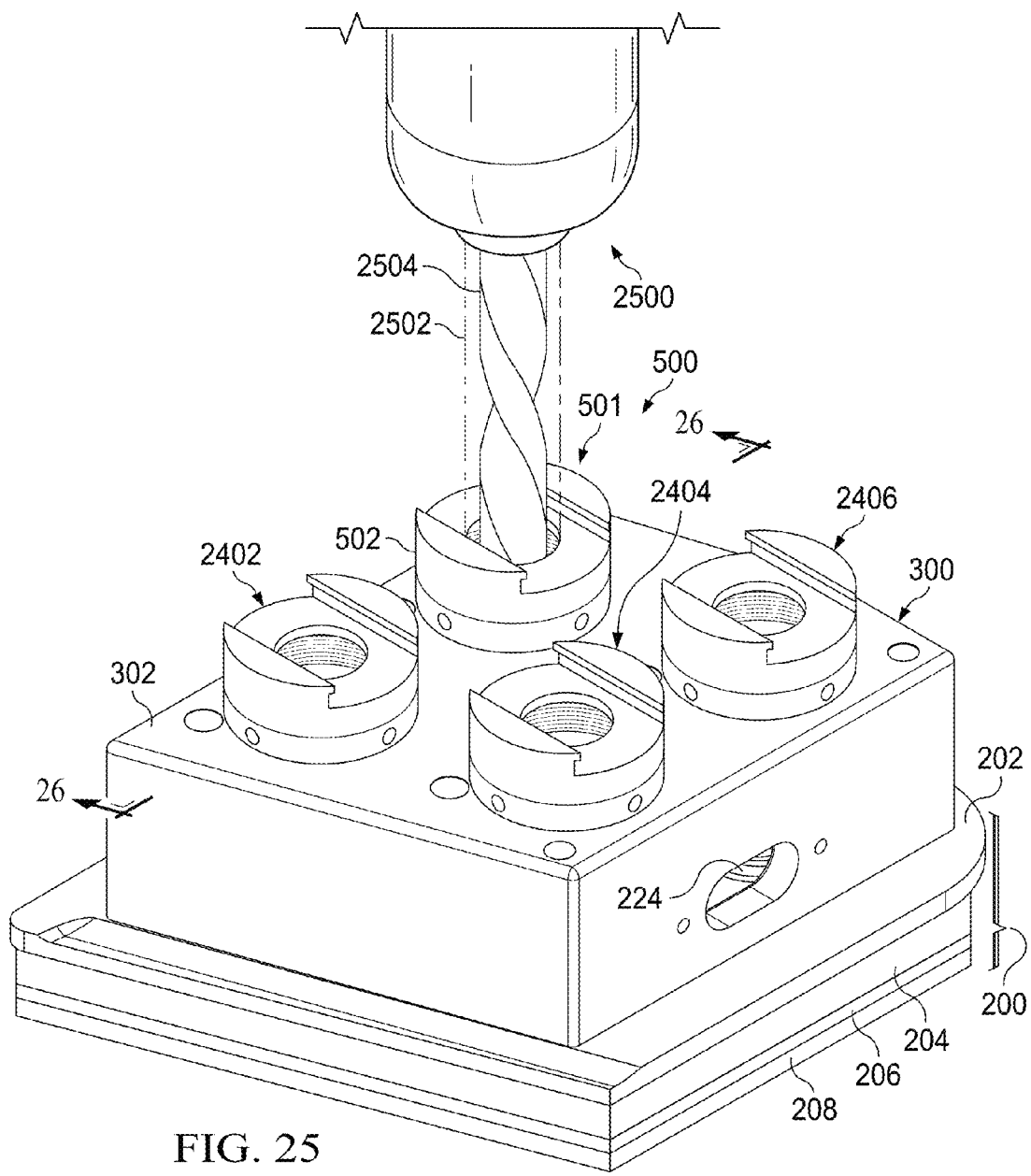
FIG. 25 is an illustration of an isometric view of a drill being used to form a final opening in the stackup of parts in accordance with an illustrative example.

With reference now to FIG. 25, an illustration of an isometric view of a drill being used to form a final hole in stackup of parts 200 is depicted in accordance with an illustrative example. In this illustrative example, drill 2500 may be used to form final holes in stackup of parts 200. Drill 2500 is an example of one implementation for tool 106 in FIG. 1. Drill 2500 includes bushing collar 2502 and drill bit 2504. Bushing collar 2502 is shown in phantom in this view.

As depicted, drill 2500 may be inserted through each of bushing assemblies 500, 2402, 2404, and 2406 such that drill 2500 may be guided by the core elements in these bushing assemblies. In particular, bushing collar 2502 of drill 2500 may form a sliding fit with the core element in each of bushing assemblies 500, 2402, 2404, and 2406. Further, with these core elements concentrically aligned with the initial openings (not shown in this view) in stackup of parts 200, bushing collar 2502 and drill bit 2504 may also be concentrically aligned with these initial openings.

Figure 26:
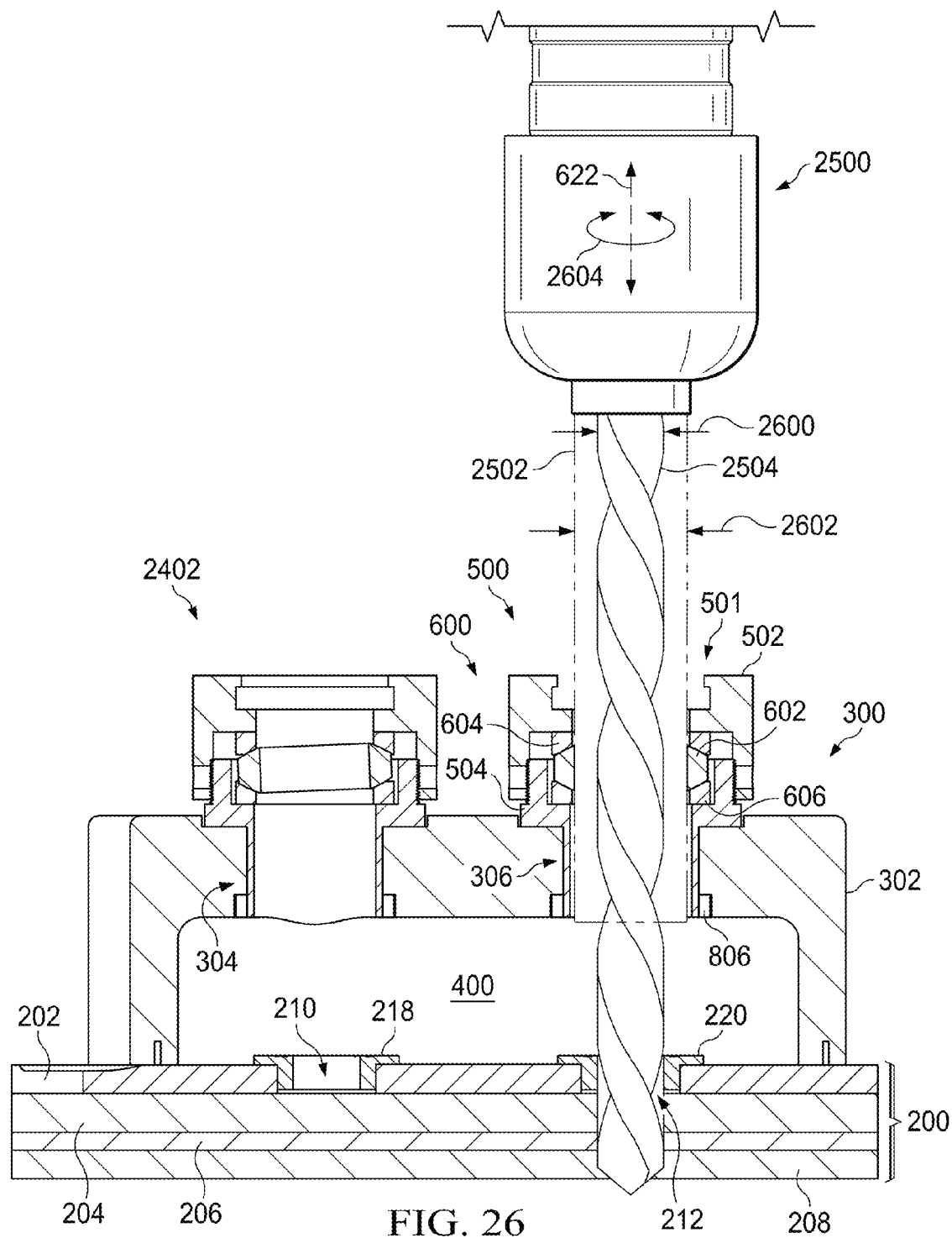
FIG. 26 is an illustration of a cross-sectional view of the drill being used to form a final opening in the stackup of parts in accordance with an illustrative example.

With reference now to FIG. 26, an illustration of a cross-sectional view of drill 2500 from FIG. 25 being used to form a final hole in stackup of parts 200 is depicted in accordance with an illustrative example. As depicted, a cross-sectional view of alignment system 300 positioned proximate stackup of parts 200 with drill 2500 in bushing assembly 500 is depicted taken along lines 26-26 in FIG. 25.

As depicted, drill bit 2504 has diameter 2600. Bushing collar 2502 has diameter 2602. When drill 2500 is operated, drill bit 2504 rotates in a direction of arrow 2604 about center axis 622. As drill bit 2504 passes through initial opening 212, it may remove material from sleeve 220 and forms a final opening that extends all the way through stackup of parts 200. In a similar manner, drill 2500 may be guided by the core elements in each of bushing assemblies 500, 2402, 2404, and 2406 to form final openings that are concentric with initial openings 210, 212, 214, and 216 (not shown in this view) in part 202.

Figure 27:
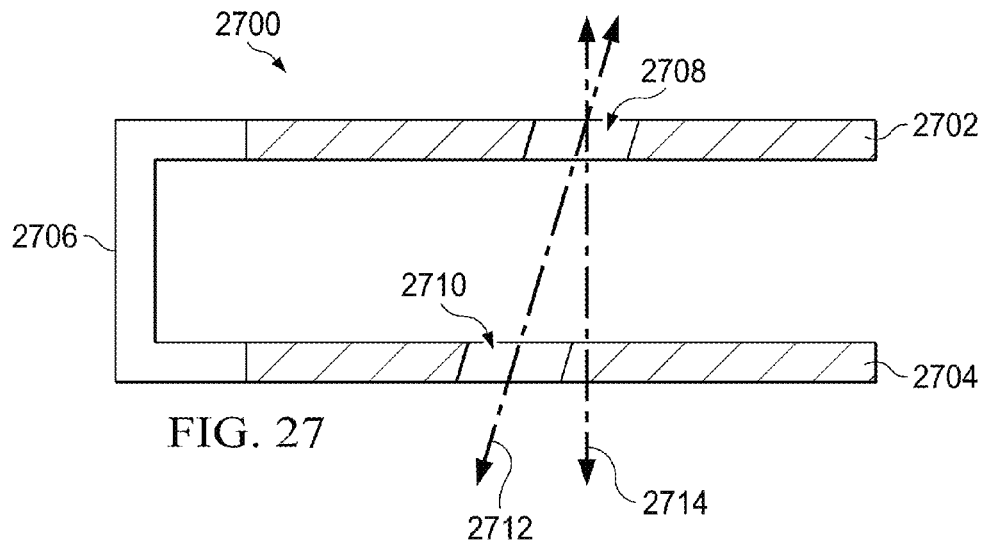
FIG. 27 is an illustration of an assembly of parts having initial openings in accordance with an illustrative example.

With reference now to FIG. 27, an illustration of an assembly of parts having initial openings is depicted in accordance with an illustrative embodiment. In this illustrative example, assembly 2700 includes part 2702 and part 2704. Part 2702 and part 2704 are joined together by device clamp 2706.

In this illustrative example, part 2702 has initial hole 2708 and part 2704 has initial hole 2710. As depicted, initial hole 2708 and initial hole 2710 may be substantially concentric. In particular, these initial holes share center axis 2712. However, center axis 2712 may be at an angle offset from normal axis 2714 through part 2702 and part 2704.

A bushing assembly, such as bushing assembly 500 from FIG. 5 having configuration 600 in FIG. 6, configuration 1000 in FIG. 10, configuration 1400 in FIG. 14, configuration 1800 in FIG. 18, or any one of potential shapes 2300 in FIG. 23 may be used to concentrically align a tool with initial hole 2708 and initial hole 2710.

The illustrations in FIGS. 2-27 are not meant to imply physical or architectural limitations to the manner in which the various illustrative examples may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

Some of the components in FIGS. 2-27 may be illustrative examples of how components shown in block form in FIG. 1 can be implemented as physical structures. Additionally, the different components shown in FIGS. 2-27 may be combined with components in FIG. 1, used with components in FIG. 1, or a combination of the two.

Figure 28:
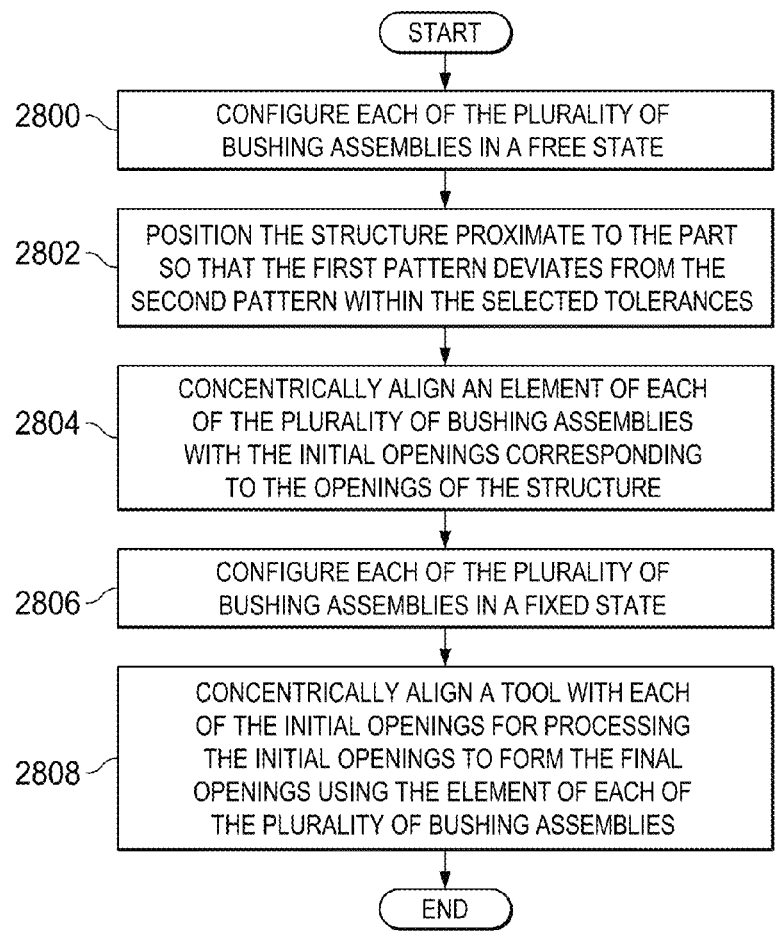
FIG. 28 is an illustration of a process for forming final openings in a part in the form of a flowchart in accordance with an illustrative example.

With reference now to FIG. 28, an illustration of a process for forming final openings in a part in the form of a flowchart is depicted in accordance with an illustrative embodiment. The process illustrated in FIG. 28 may be implemented using, for example, alignment system 112 from FIG. 1. This alignment system may be used to form final openings in a part that already has initial openings.

The alignment system used may include a structure, a plurality of bushing assemblies, and an elongate member. The structure may have openings, each associated with one of the plurality of bushing assemblies. The initial openings have a first pattern and the openings of the structure have a second pattern deviating from the first pattern within selected tolerances. Each of the plurality of bushing assemblies may be configurable in a free state or a fixed state. In the free state, an element of each of the plurality of bushing assemblies may have at least two rotational degrees of freedom and at least two translational degrees of freedom. In the fixed state, the element of each of the plurality of bushing assemblies has zero degrees of freedom.

The process begins by configuring each of the plurality of bushing assemblies in a free state (operation 2800). Thereafter, the process positions the structure proximate to the part so that the first pattern deviates from the second pattern within the selected tolerances (operation 2802). In operation 2802, at least one of the openings of the structure is offset, not concentric, or both with respect to an initial opening in the part corresponding thereto.

Next, the process concentrically aligns an element of each of the plurality of bushing assemblies with the initial openings corresponding to the openings of the structure (operation 2804). The process then configures each of the plurality of bushing assemblies in a fixed state (operation 2806). Thereafter, the process concentrically aligns a tool with each of the initial openings for processing the initial openings to form the final openings using the element of each of the plurality of bushing assemblies (operation 2808), with the process terminating thereafter. In this manner, the final openings may be substantially concentric with the initial openings.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative examples of the disclosure may be described in the context of aircraft manufacturing and service method 2900 as shown in FIG. 29 and aircraft 3000 as shown in FIG. 30. Turning first to FIG. 29, an illustration of an aircraft manufacturing and service method is depicted in accordance with an illustrative example. During pre-production, aircraft manufacturing and service method 2900 may include specification and design 2902 of aircraft 3000 in FIG. 30 and material procurement 2904.

During production, component and subassembly manufacturing 2906 and system integration 2908 of aircraft 3000 in FIG. 30 takes place. Thereafter, aircraft 3000 in FIG. 30 may go through certification and delivery 2910 in order to be placed in service 2912. While in service 2912 by a customer, aircraft 3000 in FIG. 30 is scheduled for routine maintenance and service 2914, which may include modification, reconfiguration, refurbishment, and other maintenance or service.

Each of the processes of aircraft manufacturing and service method 2900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 30, an illustration of an aircraft is depicted in which an illustrative example may be implemented. In this example, aircraft 3000 is produced by aircraft manufacturing and service method 2900 in FIG. 29 and may include airframe 3002 with a plurality of systems 3004 and interior 3006. Examples of systems 3004 include one or more of propulsion system 3008, electrical system 3010, hydraulic system 3012, and environmental system 3014. Any number of other systems may be included. Although an aerospace example is shown, different illustrative examples may be applied to other industries, such as the automotive industry.

Apparatuses and methods embodied herein may be employed during at least one of the stages of aircraft manufacturing and service method 2900 in FIG. 29. For example, an alignment system, implemented in a manner such as alignment system 112 from FIG. 1, may be used when forming final holes in parts for aircraft 3000. The alignment system may be used during component and subassembly manufacturing 2906, system integration 2908, and/or routine maintenance and service 2914.

As one illustrative example, the alignment system may be used for forming final holes in a stackup of parts. These parts may include, for example, a wing panel, a fuselage structure, a plate, and/or other parts used to attach a wing for aircraft 3000 to the fuselage of aircraft 3000. The final holes may be formed to accommodate fastener systems used to attach the wing to the fuselage of aircraft 3000.

In one illustrative example, components or subassemblies produced in component and subassembly manufacturing 2906 in FIG. 29 may be fabricated or manufactured in a manner similar to components or subassemblies produced while aircraft 3000 is in service 2912 in FIG. 29. For example, a measurement system, in accordance with an illustrative example, may be used to identify locations of openings during component and subassembly manufacturing 2906 to manufacture assemblies or subassemblies in which a stackup of parts are connected to each other. Additionally, the measurement system, in the illustrative examples, also may be used during system integration when different components are connected to each other. Further, during maintenance and service 2914, a measurement system may be used when performing maintenance, refurbishment, upgrades, and other operations in which parts may be connected to each other or otherwise inspected. The use of a number of the different illustrative examples may substantially expedite the assembly of and/or reduce the cost of aircraft 3000.

The description of the different illustrative examples has been presented for purposes of illustration and description, and is not intended to be exhaustive or limited to the examples in the form disclosed. Many modifications and variations will be apparent to those of ordinary skill in the art.

Although the illustrative examples for an illustrative example are described with respect to an aircraft, an illustrative example may be applied to other types of platforms. The platform may be, for example, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, a power plant, a bridge, a dam, a house, a manufacturing facility, a building, and other suitable objects.

Further, different illustrative examples may provide different features as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A drill jig plate comprising:
a plurality of bushing assemblies, each bushing assembly comprising:
a first element;
a second element; and
a core element retained between the first element and the second element, wherein the core element has at least two rotational degrees of freedom and at least two translational degrees of freedom when the bushing assembly is in a free state and zero degrees of freedom when the bushing assembly is in a fixed state.

2. The drill jig plate of claim 1, each bushing assembly further comprising:
means for selectively achieving the free state and the fixed state of the bushing assembly.

3. The drill jig plate of claim 2, wherein the means for selectively achieving the free state and the fixed state of the bushing assembly is a locking mechanism.

4. The drill jig plate of claim 3, wherein the locking mechanism comprises a clamping device.

5. The drill jig plate of claim 4, wherein the clamping device comprises:
a first threaded element; and
a second threaded element threadingly engageable with the first threaded element.

6. The drill jig plate of claim 1, wherein the first element is selected from one of a first threaded element and a first bushing and the second element is selected from one of a second threaded element and a second bushing.

7. The drill jig plate of claim 1, wherein the first element has a first bearing surface and the second element has a second bearing surface, and wherein the core element is located between the first bearing surface and the second bearing surface.

8. The drill jig plate of claim 7, wherein the first bearing surface has a first shape selected from one of a spherical concave shape, a spherical convex shape, and a flanged shape, and wherein the second bearing surface has a second shape selected from one of the spherical concave shape, the spherical convex shape, and the flanged shape.

9. The drill jig plate of claim 8, wherein the first shape of the first bearing surface and the second shape of the second bearing surface are the same.

10. The drill jig plate of claim 8, wherein the first shape of the first bearing surface and the second shape of the second bearing surface are different.

11. The drill jig plate of claim 7, wherein the core element comprises a first contact surface having a first shape, the first contact surface contacting the first bearing surface, and a second contact surface having a second shape, the second contact surface contacting the second bearing surface.

12. The drill jig plate of claim 11, wherein the first shape of the first contact surface and the second shape of the second contact surface are selected from a group consisting of a spherical concave shape, a spherical convex shape, and a flat shape.

13. The drill jig plate of claim 12, wherein the flat shape is selected from a group consisting of circular shapes and polygonal shapes.

14. The drill jig plate of claim 11, wherein the first shape of the first contact surface and the second shape of the second contact surface are the same.

15. The drill jig plate of claim 11, wherein the first shape of the first contact surface and the second shape of the second contact surface are different.

16. The drill jig plate of claim 1, wherein the core element has a single contact surface that includes a spherical portion.

17. The drill jig plate of claim 1, wherein the at least two rotational degrees of freedom include pitch and roll.

18. The drill jig plate of claim 1 further comprising:
a hollow portion that extends through the first element, the second element, and the core element of the bushing assembly, wherein the hollow portion is formed by an opening in each of the first element, the second element, and the core element.

19. A drill jig plate comprising:
a structure having a plurality of openings; and
a plurality of bushing assemblies, wherein each of the plurality of bushing assemblies is associated with one of the plurality of openings and wherein each of the plurality of bushing assemblies comprises:
a first element;
a second element; and
a core element retained between the first element and the second element, wherein the core element has at least two rotational degrees of freedom and at least two translational degrees of freedom when a bushing assembly is in a free state and zero degrees of freedom when the bushing assembly is in a fixed state.

20. The drill jig plate of claim 19, wherein each of the plurality of bushing assemblies further comprises:
a hollow portion that extends through the first element, the second element, and the core element of the bushing assembly, wherein the hollow portion is formed by an opening in each of the first element, the second element, and the core element.

21. The jig plate of claim 19 further comprising:
a means for selectively achieving the free state and the fixed state of the bushing assembly.

* * * * *